United States Patent
Kozuka

(10) Patent No.: US 11,018,360 B2
(45) Date of Patent: May 25, 2021

(54) FUEL CELL SYSTEM

(71) Applicant: TOYOTA JIDOSHA KABUSHIKI KAISHA, Toyota (JP)

(72) Inventor: Tomoyuki Kozuka, Nagoya (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 203 days.

(21) Appl. No.: 16/168,051

(22) Filed: Oct. 23, 2018

(65) Prior Publication Data

US 2019/0148751 A1  May 16, 2019

(30) Foreign Application Priority Data

Nov. 16, 2017 (JP) .............................. JP2017-220614

(51) Int. Cl.
| | | |
|---|---|---|
| H01M 8/04701 | (2016.01) | |
| H01M 8/04007 | (2016.01) | |
| H01M 8/04082 | (2016.01) | |
| H01M 8/0432 | (2016.01) | |
| H01M 8/0438 | (2016.01) | |
| H01M 8/04537 | (2016.01) | |
| H01M 8/04029 | (2016.01) | |
| H01M 8/04089 | (2016.01) | |
| H01M 8/1018 | (2016.01) | |

(52) U.S. Cl.
CPC ... *H01M 8/04738* (2013.01); *H01M 8/04029* (2013.01); *H01M 8/04074* (2013.01); *H01M 8/04097* (2013.01); *H01M 8/04201* (2013.01); *H01M 8/04328* (2013.01); *H01M 8/04373* (2013.01); *H01M 8/04388* (2013.01); *H01M 8/04425* (2013.01); *H01M 8/04626* (2013.01); *H01M 2008/1095* (2013.01); *H01M 2250/20* (2013.01)

(58) Field of Classification Search
None
See application file for complete search history.

(56) References Cited

U.S. PATENT DOCUMENTS

| | | | |
|---|---|---|---|
| 2003/0134167 A1 | 7/2003 | Hirakata | |
| 2010/0183934 A1* | 7/2010 | Yukimasa | H01M 8/04029 429/437 |
| 2016/0141665 A1* | 5/2016 | Toida | H01M 8/04201 429/415 |

FOREIGN PATENT DOCUMENTS

| | | | |
|---|---|---|---|
| JP | 2001-351667 A | 12/2001 | |
| JP | 2007-247421 A | 9/2007 | |
| JP | 2009-250219 | * 10/2009 | |
| JP | 2017-089539 | 5/2017 | |
| WO | WO-2008041528 A1 * | 4/2008 | ............ F24D 11/005 |

* cited by examiner

*Primary Examiner* — Basia A Ridley
*Assistant Examiner* — Heng M. Chan
(74) *Attorney, Agent, or Firm* — Finnegan, Henderson, Farabow, Garrett & Dunner, LLP

(57) ABSTRACT

The fuel cell system includes a fuel cell, a hydrogen circulation pump, heating portion, and a controller. The hydrogen circulation pump is configured to circulate hydrogen to the fuel cell and includes a cylinder and a rotor accommodated in the cylinder. The heating portion is configured to heat the cylinder. The controller is configured to control an operation of the heating portion. The controller is configured to cause the heating portion to heat the cylinder in a case where a driving state of the hydrogen circulation pump is higher than or equal to a standard driving state.

12 Claims, 12 Drawing Sheets

FUEL CELL SYSTEM

INCORPORATION BY REFERENCE

The disclosure of Japanese Patent Application No. 2017-220614 filed on Nov. 16, 2017 including the specification, drawings and abstract is incorporated herein by reference in its entirety.

BACKGROUND

1. Technical Field

The present disclosure relates to a fuel cell system.

2. Description of Related Art

In a fuel cell system, typically, a hydrogen pump for circulating hydrogen to a hydrogen circulation path of the fuel cell system is provided. As the hydrogen pump, Japanese Unexamined Patent Application Publication No. 2017-089539 (JP 2017-089539 A) discloses an example in which heating means is provided in a housing of a hydrogen pump in order to restrain the housing of the hydrogen pump and a rotor accommodated in the housing from adhering to each other due to freezing.

SUMMARY

For the hydrogen pump used in the fuel cell system, further improvement of circulation efficiency is desired. In order to improve the circulation efficiency of the hydrogen pump, it is desired to reduce a clearance between the rotor and the housing (hereinafter, also simply referred to as "cylinder"). However, the present inventors found that, in a case where the clearance is reduced, the following problems may occur. That is, the temperature of the rotor increases according to an increase in the driving amount of the rotor, and in a case where a temperature difference between the rotor and the cylinder increases, malfunction may occur due to an interference between the rotor and the cylinder.

An aspect of the disclosure relates to a fuel cell system including a fuel cell, a hydrogen circulation pump, a heating portion, and a controller. The hydrogen circulation pump is configured to circulate hydrogen to the fuel cell and includes a cylinder and a rotor accommodated in the cylinder. The heating portion is configured to heat the cylinder. The controller is configured to control an operation of the heating portion. The controller is configured to cause the heating portion to heat the cylinder in a case where a driving state of the hydrogen circulation pump is higher than or equal to a standard driving state. In a case where the driving state of the hydrogen circulation pump is higher than or equal to the standard driving state, the temperature of the rotor becomes higher than the temperature of the cylinder according to the driving amount of the rotor, a temperature difference between the rotor and the cylinder increases, and thus malfunction may occur due to an interference between the rotor and the cylinder. According to the aspect of the disclosure, in a case where the driving state of the hydrogen circulation pump is higher than or equal to the standard driving state, the cylinder is heated by the heating portion. As a result, the temperature of the cylinder can be made to approach the temperature of the rotor, and malfunction caused by an interference between the rotor and the cylinder can be further suppressed.

In the fuel cell system according to the aspect of the disclosure, in the hydrogen circulation pump, a clearance between the rotor and the cylinder may be 20 µm or less. According to the aspect of the disclosure, the clearance between the rotor and the cylinder is 20 µm or less. Therefore, malfunction caused by an interference between the rotor and the cylinder can be further suppressed, and hydrogen can be effectively circulated to the fuel cell.

In the fuel cell system according to the aspect of the disclosure, the heating portion may include a heating medium passage and a heating medium supply pump for circulating a heating medium to the heating medium passage, the heating medium passage including a first passage and a second passage, the first passage being provided in the fuel cell, and the second passage being provided in the cylinder of the hydrogen circulation pump. According to the aspect of the disclosure, the cylinder is heated by circulating the heating medium to the heating medium passage of the cylinder. As a result, the temperature of the cylinder can be made to approach the temperature of the rotor, and malfunction caused by an interference between the rotor and the cylinder can be further suppressed.

The fuel cell system according to the aspect of the disclosure may further include a driving amount sensor configured to detect a rotating speed of the rotor as the driving state. The controller may be configured to cause the heating portion to heat the cylinder in a case where the rotating speed of the rotor detected by the driving amount sensor is higher than or equal to a threshold that is predetermined as the standard driving state. According to the aspect of the disclosure, in a case where the rotating speed of the rotor is higher than or equal to the threshold, the cylinder is heated. Therefore, the cylinder can be easily heated without obtaining a temperature difference between the rotor and the cylinder, the temperature of the cylinder can be made to approach the temperature of the rotor, and malfunction caused by an interference between the rotor and the cylinder can be further suppressed.

The fuel cell system according to the aspect of the disclosure may further include a driving amount sensor configured to detect a rotating speed of the rotor and a temperature sensor configured to detect a temperature corresponding to a temperature of the cylinder. The controller may be configured to obtain a temperature difference between the rotor and the cylinder as the driving state based on a temperature of the rotor and a temperature of the cylinder. The temperature of the rotor is determined based on an initial temperature of the cylinder and an increased temperature of the rotor. The initial temperature of the cylinder is obtained based on the temperature detected by the temperature sensor at the time of initiation of an operation of the hydrogen circulation pump. The increased temperature of the rotor is a temperature increased from the initiation of the operation of the hydrogen circulation pump that is obtained according to the rotating speed of the rotor detected by the driving amount sensor. The temperature of the cylinder is obtained from the temperature detected by the temperature sensor in a state where the hydrogen circulation pump operates at the rotating speed of the rotor. The controller may be configured to cause the heating portion to heat the cylinder in a case where the temperature difference between the rotor and the cylinder is higher than or equal to an allowable temperature difference that is predetermined as the standard driving state. According to the aspect of the disclosure, in a case where the temperature difference between the rotor and the cylinder that are actually close to each other is likely to be higher than or equal to the predetermined allowable temperature difference, the cylinder can be heated, an interference between the rotor and the cylinder can be further suppressed, and malfunction can be further suppressed.

The fuel cell system according to the aspect of the disclosure may further include a temperature sensor configured to detect a temperature corresponding to a temperature of the cylinder, a flow rate sensor configured to detect a gas inflow rate to the hydrogen circulation pump, an input side pressure sensor configured to detect an input side pressure of the hydrogen circulation pump, an output side pressure sensor configured to detect an output side pressure of the hydrogen circulation pump, and a gas temperature sensor configured to detect a temperature of gas flowing to the hydrogen circulation pump. The controller may be configured to obtain a temperature difference between the rotor and the cylinder as the driving state based on an initial temperature of the rotor, an initial temperature of the cylinder, the gas inflow rate, the input side pressure, the output side pressure, and the temperature of the gas, the initial temperature of the rotor and the initial temperature of the cylinder being obtained based on the temperature detected by the temperature sensor at the time of initiation of the operation of the hydrogen circulation pump. The controller may be configured to cause the heating portion to heat the cylinder in a case where the temperature difference between the rotor and the cylinder is higher than or equal to an allowable temperature difference that is predetermined as the standard driving state. According to the aspect of the disclosure, in a case where the temperature difference between the rotor and the cylinder that are actually close to each other is likely to be higher than or equal to the predetermined allowable temperature difference, the cylinder can be heated, an interference between the rotor and the cylinder can be further suppressed, and malfunction can be further suppressed.

In the fuel cell system according to the aspect of the disclosure, the rotor and the cylinder may be made of the same metal material. According to the aspect of the disclosure, the rotor and the cylinder are made of the same metal material. Therefore, characteristics of thermal expansion and shrinkage of the rotor and cylinder can be made to match with each other, and an interference between the rotor and the cylinder can be easily suppressed.

The fuel cell system according to the aspect of the disclosure may further include a driving amount sensor configured to detect a rotating speed of the rotor as the driving state. The controller may be configured to cause the heating portion to heat the cylinder in a case where the rotating speed of the rotor detected by the driving amount sensor is higher than or equal to a threshold that is predetermined as the standard driving state.

The fuel cell system according to the aspect of the disclosure may further include a driving amount sensor configured to detect a rotating speed of the rotor and a temperature sensor configured to detect a temperature corresponding to a temperature of the cylinder. The controller may be configured to obtain a temperature difference between the rotor and the cylinder as the driving state based on a temperature of the rotor and a temperature of the cylinder. The temperature of the rotor is determined based on an initial temperature of the cylinder and an increased temperature of the rotor. The initial temperature of the cylinder is obtained based on the temperature detected by the temperature sensor at the time of initiation of the operation of the hydrogen circulation pump. The increased temperature of the rotor is a temperature increased from the initiation of the operation of the hydrogen circulation pump that is obtained according to the rotating speed of the rotor detected by the driving amount sensor. The temperature of the cylinder is obtained from the temperature detected by the temperature sensor in a state where the hydrogen circulation pump operates at the rotating speed of the rotor. The controller may be configured to cause the heating portion to heat the cylinder in a case where the temperature difference between the rotor and the cylinder is higher than or equal to an allowable temperature difference that is predetermined as the standard driving state.

The fuel cell system according to the aspect of the disclosure may further include a temperature sensor configured to detect a temperature corresponding to a temperature of the cylinder, a flow rate sensor configured to detect a gas inflow rate to the hydrogen circulation pump, an input side pressure sensor configured to detect an input side pressure of the hydrogen circulation pump, an output side pressure sensor configured to detect an output side pressure of the hydrogen circulation pump, and a gas temperature sensor configured to detect a temperature of gas flowing to the hydrogen circulation pump. The controller may be configured to obtain a temperature difference between the rotor and the cylinder as the driving state based on an initial temperature of the rotor, an initial temperature of the cylinder, the gas inflow rate, the input side pressure, the output side pressure, and the temperature of the gas, the initial temperature of the rotor and the initial temperature of the cylinder being obtained based on the temperature detected by the temperature sensor at the time of initiation of the operation of the hydrogen circulation pump. The controller may be configured to cause the heating portion to heat the cylinder in a case where the temperature difference between the rotor and the cylinder is higher than or equal to an allowable temperature difference that is predetermined as the standard driving state.

In the fuel cell system according to the aspect of the disclosure, the rotor and the cylinder may be made of the same metal material.

In the fuel cell system according to the aspect of the disclosure, the controller may be configured to increase a flow rate of the heating medium by increasing the driving amount of the heating medium supply pump according to an increase in the rotating speed of the rotor in a case where the heating medium supplied by the heating medium supply pump is circulated to the cylinder. According to the aspect of the disclosure, the flow rate at which the heating medium is circulated to the heating medium passage can be increased according to the increase in the rotating speed of the rotor. Therefore, by effectively supplying the heating medium, the rotor can be effectively heated, and the occurrence of malfunction due to an interference between the rotor and the cylinder can be further suppressed effectively.

The technique disclosed in this specification can be implemented in various forms. For example, the disclosure can be realized in forms such as a moving object on which a fuel cell system is mounted or a control method for a fuel cell system.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment

Figure 1:
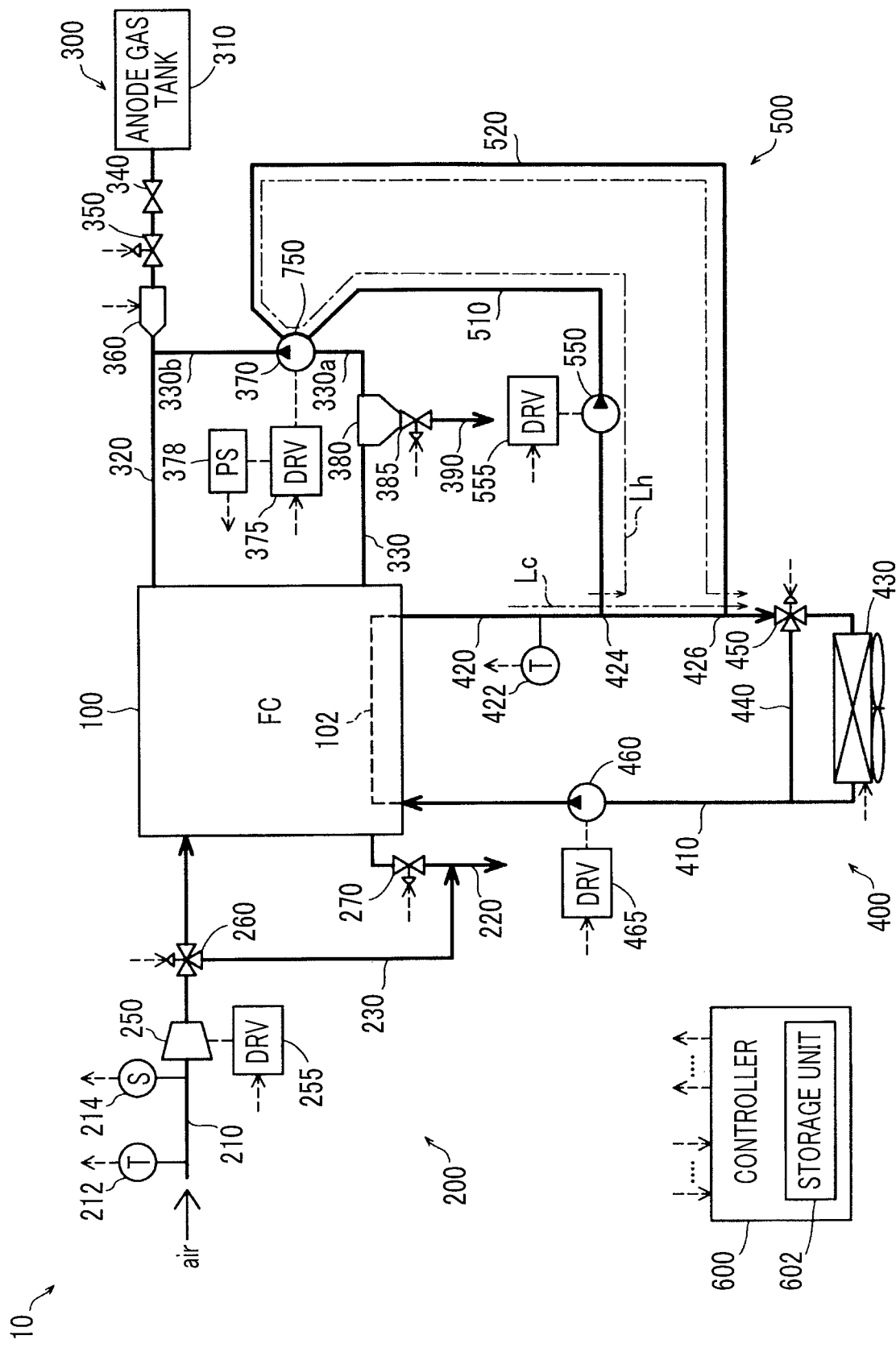
FIG. 1 is a diagram schematically showing a fuel cell system according to a first embodiment.

FIG. 1 is a diagram schematically showing a fuel cell system 10 according to a first embodiment. The fuel cell system 10 is mounted on, for example, a vehicle (fuel cell vehicle) and outputs electric power as a power source for a vehicle in response to a request from a driver. The fuel cell system 10 includes a fuel cell (FC) 100, a cathode gas supply portion 200, an anode gas supply portion 300, a FC cooling portion 400, a heating portion 500, and a controller 600.

The fuel cell 100 has a stack structure in which a plurality of single cells (not shown) as power generation units is stacked. In the embodiment, the fuel cell 100 is a solid polymer electrolyte fuel cell, but another type of fuel cell may be used. As a support of an electrode catalyst of the fuel cell 100, a carbon material is used.

The anode gas supply portion 300 includes an anode gas tank 310, an anode gas supply pipe 320, an anode gas circulation pipe 330, a main stop valve 340, a pressure regulating valve 350, an injector 360, an anode gas pump 370, a gas-liquid separator 380, an exhaust-drain valve 385, and an exhaust-drain pipe 390. In the embodiment, an example in which hydrogen is used as anode gas is shown, and the anode gas pump 370 can be considered as "hydrogen circulation pump".

The anode gas tank 310 stores, for example, high-pressure hydrogen gas. The anode gas tank 310 is connected to the fuel cell 100 through the anode gas supply pipe 320. In the anode gas supply pipe 320, the main stop valve 340, the pressure regulating valve 350, and the injector 360 are provided in this order from the anode gas tank 310 side. The main stop valve 340 starts or stops the supply of the anode gas from the anode gas tank 310. The pressure regulating valve 350 regulates a pressure of the anode gas supplied to the injector 360. The injector 360 injects the anode gas supplied from the pressure regulating valve 350 toward an anode of the fuel cell 100 through the anode gas supply pipe 320.

The anode gas circulation pipe 330 is connected to the fuel cell 100 and the anode gas supply pipe 320, and circulates anode exhaust gas exhausted from the fuel cell 100 to the anode gas supply pipe 320 as the anode gas. In the anode gas circulation pipe 330, the gas-liquid separator 380 and the anode gas pump 370 are provided. The gas-liquid separator 380 separates liquid water from the anode exhaust gas including the liquid water that is exhausted from the fuel cell 100. Impurity gas such as nitrogen gas included in the anode exhaust gas is also separated together with the liquid water. The anode exhaust gas including unreacted hydrogen gas is separated into liquid water and impurity gas, and is driven by the anode gas pump 370 to be circuited to the anode gas supply pipe 320 through a portion 330b of the anode gas circulation pipe 330 as the anode gas The separated liquid water and nitrogen gas pass through the exhaust-drain valve 385 and the exhaust-drain pipe 390 that are connected to the gas-liquid separator 380, and are exhausted to the outside of the system. The anode gas pump 370 is driven by drive electric power supplied from a drive circuit 375. The main stop valve 340, the pressure regulating valve 350, the injector 360, and the drive circuit 375 of the anode gas pump 370 are controlled by the controller 600.

A rotating speed or a flow rate which is a driving amount of the anode gas pump 370 is obtained based on electric power supplied to the anode gas pump 370 by the drive circuit 375. The drive electric power is obtained by a voltage/current sensor 378 detecting a voltage and a current supplied from the drive circuit 375 to the anode gas pump 370 or a voltage and a current input to the drive circuit 375. The voltage/current sensor 378 can be considered as "driving amount sensor".

The cathode gas supply portion 200 includes a cathode gas supply pipe 210, a bypass pipe 230, a cathode gas exhaust pipe 220, an air compressor 250, a flow dividing valve 260, and a pressure regulating valve 270.

In the cathode gas supply pipe 210, an ambient temperature sensor 212, an air flow meter 214, an air compressor 250, a flow dividing valve 260 and are provided. The ambient temperature sensor 212 detects (measures) a temperature of the cathode gas before the intake as an ambient temperature. The air flow meter 214 detects the amount of the cathode gas that is taken in. The flow dividing valve 260 is connected to the bypass pipe 230 and divides and supplies the cathode gas to the fuel cell 100 and the bypass pipe 230.

In the cathode gas exhaust pipe 220, the pressure regulating valve 270 is provided. A downstream portion of the bypass pipe 230 is connected to the cathode gas exhaust pipe 220 that is provided downstream of the pressure regulating valve 270. The pressure regulating valve 270 regulates a pressure of the cathode gas supplied to the fuel cell 100. Although not shown in the drawing, a downstream portion of the exhaust-drain pipe 390 in the anode gas supply portion 300 is connected to the downstream side of the cathode gas exhaust pipe 220.

The cathode gas supply portion 200 takes air (cathode gas) into the system using the air compressor 250, supplies the air to the fuel cell 100, and then exhausts non-used air (cathode exhaust gas) to the outside of the system. The air compressor 250 is driven by electric power supplied from a drive circuit 255. The drive circuit 255 of the air compressor 250, the flow dividing valve 260, and the pressure regulating valve 270 are controlled by the controller 600.

The FC cooling portion 400 includes a coolant supply pipe 410, a coolant exhaust pipe 420, a radiator 430, a bypass pipe 440, a three-way valve 450, and a coolant pump 460. Examples of a coolant include non-freezing water such as water or ethylene glycol and air. In the embodiment, antifreeze solution is used. The coolant pump 460 is provided in the coolant supply pipe 410, is driven by electric power supplied from a drive circuit 465, and supplies the coolant cooled in the radiator 430 to the coolant passage 102 of the fuel cell 100. The coolant circulating in the coolant passage 102 is circulated to the radiator 430 through the coolant exhaust pipe 420 that is heated by exhaust heat of the fuel cell 100. The radiator 430 is disposed in a front end of a front compartment of a vehicle in which the fuel cell system 10 is accommodated, and cools the coolant heated by the exhaust heat of the fuel cell 100 using cooled air taken from the front side. The three-way valve 450 is a valve for regulating a flow rate of the coolant supplied to the radiator 430 and the bypass pipe 440. In the coolant exhaust pipe 420, a coolant temperature sensor 422 for detecting a temperature of a coolant Lc of the coolant exhaust pipe 420 is provided at a position upstream of a connection position 424 of a heating medium supply pipe 510 described below. The coolant temperature detected by the coolant temperature sensor 422 is input to the controller 600 and is used for the control of the heating portion 500.

The heating portion 500 includes the heating medium supply pipe 510, a heating medium circulation pipe 520, and a heating medium supply pump 550. The heating medium supply pipe 510 is connected to the connection position (hereinafter, also simply referred to as "branch position") 424 of the coolant exhaust pipe 420 and to an inlet of the cylinder passage 750 provided in a cylinder of the anode gas pump 370. The heating medium circulation pipe 520 is connected to an outlet of the cylinder passage 750 in the anode gas pump 370 and to connection position (hereinafter also simply referred to as "joint position") 426 downstream of the branch position 424 in the coolant exhaust pipe 420 of the heating medium supply pipe 510.

In the heating medium supply pipe 510, the heating medium supply pump 550 is provided between the branch position 424 and the cylinder passage 750 of the anode gas pump 370. The heating medium supply pipe 510 and the heating medium circulation pipe 520 are filled with the same coolant as that of the FC cooling portion 400. That is, the coolant Lc branched to the heating medium supply pipe 510 at the branch position 424 of the coolant exhaust pipe 420 is used as "heating medium Lh" that circulates in the cylinder passage 750 of the anode gas pump 370.

The heating portion 500 circulates the heating medium, which is branched at the branch position 424 and flows to the heating medium supply pipe 510, to the cylinder passage 750 of the anode gas pump 370 using the heating medium supply pump 550 so as to return the heating medium from the joint position 426 of the coolant exhaust pipe 420 to the coolant exhaust pipe 420 through the heating medium circulation pipe 520. By circulating the heating medium to the cylinder passage 750 of the anode gas pump 370, the heating portion 500 can heat the cylinder (housing) of the anode gas pump 370 where the cylinder passage 750 is provided. The heating medium supply pump 550 is driven at a constant rotating speed corresponding to electric power supplied from a drive circuit 555, and circulates the heating medium to the heating medium supply pipe 510 and the heating medium circulation pipe 520 at a flow rate corresponding to the rotating speed. The drive circuit 555 of the heating medium supply pump 550 is controlled by the controller 600.

As described above, in the heating portion 500, the coolant Lc that is heated by exhaust heat during the circulation in the coolant passage 102 of the fuel cell 100 is branched from the coolant exhaust pipe 420 to the heating medium supply pipe 510 and is used as the heating medium Lh. Therefore, the coolant passage 102 and the coolant exhaust pipe 420 of the fuel cell 100 also function as components constituting the heating portion 500. The coolant passage 102 of the fuel cell 100 can be considered as "first passage provided in the fuel cell", and the cylinder passage 750 can be considered as "second passage provided in the cylinder of the hydrogen circulation pump". The coolant passage 102, the coolant exhaust pipe 420, the heating medium supply pipe 510, the cylinder passage 750, and the heating medium circulation pipe 520 can be considered as "heating medium passage".

The controller 600 is configured as a microcomputer-based logical circuit. Specifically, the controller 600 includes: a central processing unit (CPU) that executes a predetermined operation or the like according to a preset control program; a read only memory (ROM) that stores in advance a control program, control data, or the like needed for executing various operations using the CPU; a random access memory (RAM) that temporarily reads and writes various data needed for executing various operations using the CPU; and input and output ports through which various signals are input and output. The controller 600 obtains measurement signals of the ambient temperature sensor 212, the air flow meter 214, the voltage/current sensor 378, and the coolant temperature sensor 422, information relating to a load request on the fuel cell 100, and the like. The controller 600 outputs driving signals of the respective components relating to the power generation of the fuel cell 100, for example, the valves included in the fuel cell system 10 such as the main stop valve 340, the pressure regulating valve 350, the exhaust-drain valve 385, the flow dividing valve 260, the pressure regulating valve 270, and the three-way valve 450, the air compressor 250, the anode gas pump 370, and the coolant pump 460. In order to further suppress the malfunction of the anode gas pump 370, the controller 600 controls driving of the heating medium supply pump 550 as described below.

In addition to the above-described configurations, the fuel cell system 10 further includes: a converter that boosts a voltage output from the fuel cell 100; and a power control unit that controls the supply of electric power to a load of a motor or the like that generates power of the vehicle. However, in the description of the embodiment, these components are not indispensable, and thus are not shown in the drawings and are not described.

Figure 2:
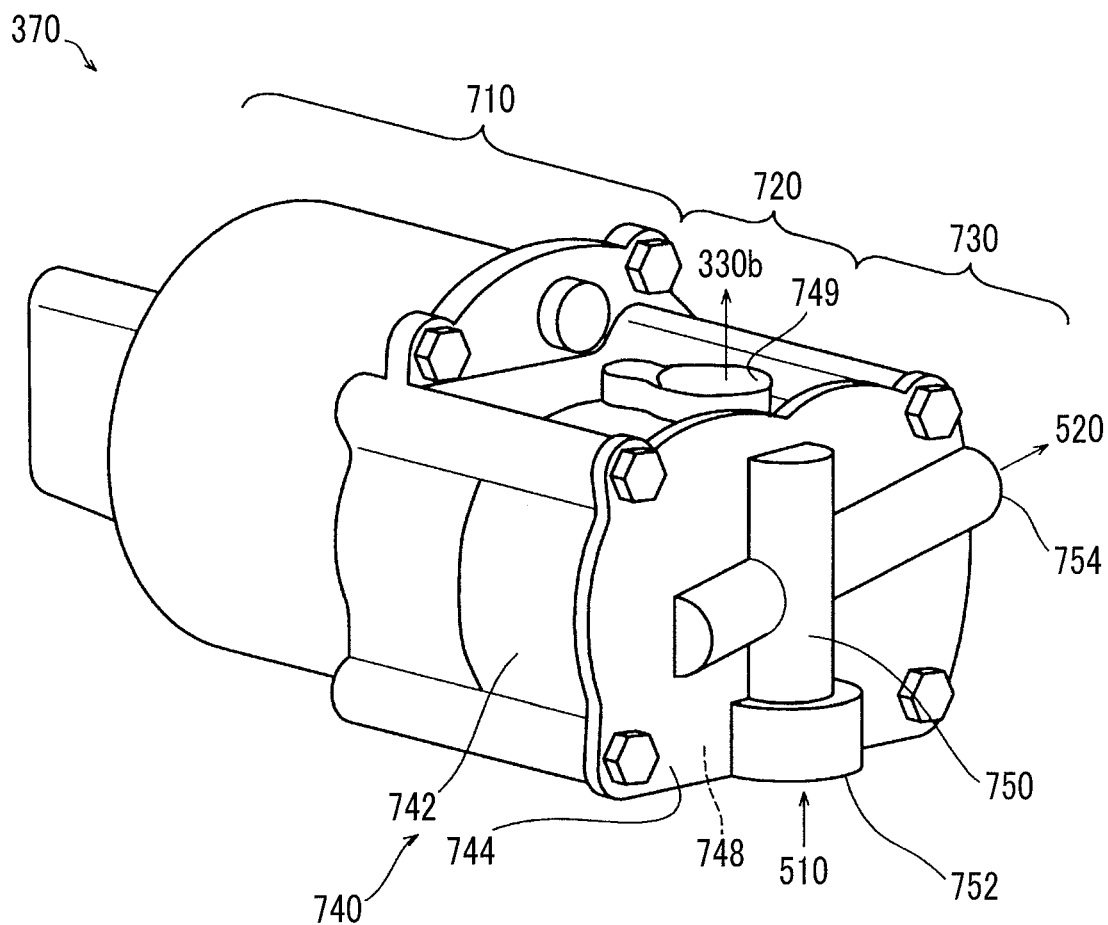
FIG. 2 is a schematic perspective view showing an example of a configuration of an anode gas pump.

FIG. 2 is a schematic perspective view showing an example of a configuration of the anode gas pump 370. The anode gas pump 370 is a Roots type pump (Roots pump), and includes a motor portion 710, a pump portion 730 including a pair of rotors, and a gear portion 720 that connects the motor portion 710 and the rotors of the pump portion 730 to each other.

Figure 3:
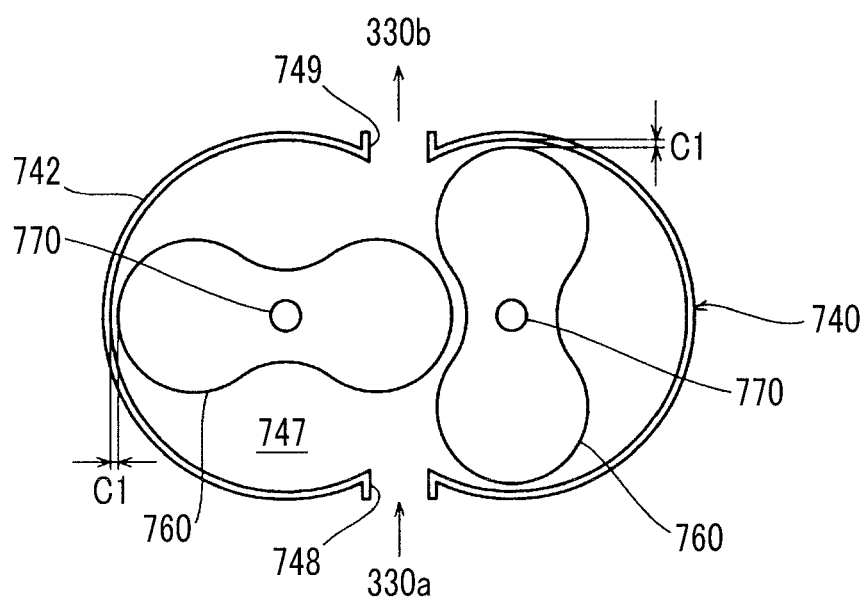
FIG. 3 is a schematic sectional view taken along a direction perpendicular to a rotating shaft of a rotor included in a pump portion constituting the anode gas pump.
Figure 4:
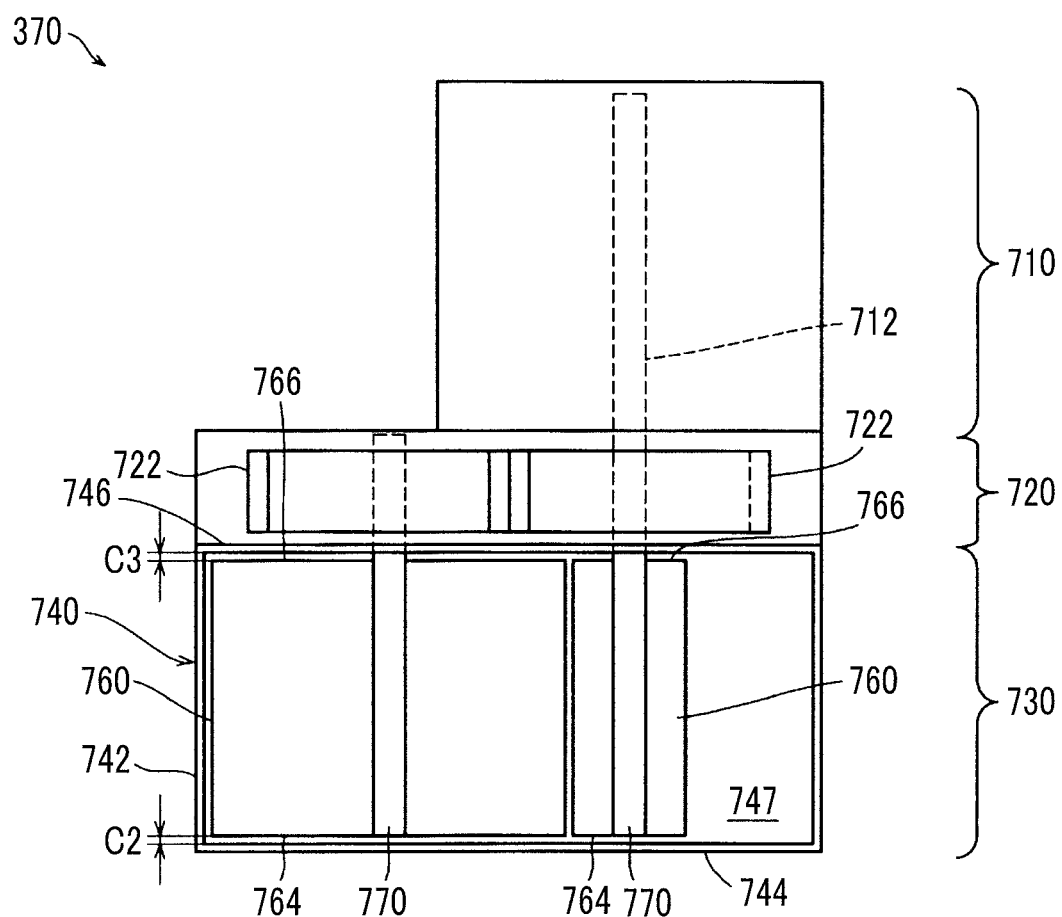
FIG. 4 is a schematic sectional view in a direction parallel to the rotating shaft of the rotor included in the pump portion constituting the anode gas pump.

FIG. 3 is a schematic sectional view taken along a direction perpendicular to a rotating shaft of the rotor included in the pump portion 730 constituting the anode gas pump 370. FIG. 4 is a schematic sectional view in a direction parallel to the rotating shaft of the rotor included in the pump portion 730 constituting the anode gas pump 370.

As shown in FIGS. 3 and 4, the pump portion 730 includes a cylinder 740 and a pair of rotors 760. The cylinder 740 includes a pair of side wall portions 744, 746; and a peripheral wall portion 742 that is provided to connect peripheral portions of the side wall portions 744, 746. In the cylinder 740, an internal space portion surrounded by the side wall portions 744, 746 and the peripheral wall portion 742 forms a pump chamber 747. As shown in FIG. 3, the cylinder 740 includes an intake port 748 and an exhaust port 749 at positions of the peripheral wall portion 742 facing each other. The intake port 748 is connected to a portion 330a (FIG. 1) of the anode gas circulation pipe 330 through which the gas-liquid separator 380 and the anode gas pump 370 are connected to each other, and the exhaust port 749 is connected to a portion 330b (FIG. 1) of the anode gas circulation pipe 330 that is joined to the anode gas supply pipe 320.

As shown in FIGS. 3 and 4, the rotors 760 are accommodated in the pump chamber 747 of the cylinder 740. In a sectional view, the rotor 760 is formed in a bud shape (gourd shape) and includes the rotating shaft 770 at the center of the rotor. The rotating shaft 770 is rotatably supported by the side wall portions 744, 746 of the cylinder 740. The rotors 760 are accommodated in the pump chamber 747 in a state where the rotors 760 mesh with each other. End surfaces 764, 766 of the rotor 760 perpendicular to the rotating shaft 770 are disposed to face the side wall portions 744, 746 of the cylinder 740.

As shown in FIG. 2, in the side wall portion 744 of the cylinder 740, the cylinder passage 750 for circulating the heating medium is provided. The heating medium supply pipe 510 is connected to a first end 752 of the cylinder passage 750, and the heating medium circulation pipe 520 is connected to a second end 754 of the cylinder passage 750. The cylinder 740 is heated by circulating the heating medium in the cylinder passage 750. The treatment of circulating the heating medium in the cylinder passage 750 will be described below in detail.

As shown in FIG. 4, the gear portion 720 is attached to the outside of the side wall portion 746 of the cylinder 740. The gear portion 720 includes a pair of gears 722. In a state where the gears 722 mesh with each other, the gears 722 are fixed to the rotating shafts 770 extending from the rotors 760 of the pump portion 730.

The motor portion 710 is attached to the opposite side of the gear portion 720 from the pump portion 730. The motor portion 710 includes a driving shaft 712. The driving shaft 712 is linked to the rotating shaft 770 of one of the rotors 760 of the pump portion 730. The motor portion 710 rotates the driving shaft 712 by being supplied with electric power from the drive circuit 375 (FIG. 1).

In the anode gas pump 370 having the structure, in a case where the motor portion 710 is driven to rotate the driving shaft 712, the rotating shaft 770 linked to the driving shaft 712 is rotated. In this case, one of the gears 722 and one of the rotors 760 provided in one of the rotating shafts 770 rotate. By one of the gears 722 rotating, the other of the gears 722 rotates in the opposite direction of the rotating direction of one of the gears 722. As a result, the other of rotating shafts 770 to which the other of the gears 722 is fixed rotates in the opposite direction of the rotating direction of one of the rotating shafts 770. Accordingly, the other of the rotors 760 rotates in the opposite direction of the rotating direction of one of the rotors 760. As a result, due to the rotation of the rotors 760 in the pump chamber 747, the hydrogen gas as the anode gas is taken from the intake port 748 into the pump chamber 747, and is exhausted from the exhaust port 749 to the outside of the pump chamber 747. As a result, the hydrogen gas that is included in the anode exhaust gas exhausted from the fuel cell 100 is transported to the anode gas circulation pipe 330, and is supplied again to the fuel cell 100 as the anode gas. That is, the hydrogen gas as the anode gas is circulated and supplied to the fuel cell 100 by the anode gas pump 370.

As described in "SUMMARY", in order to improve the circulation efficiency in the pump used in the anode gas pump 370, it is preferable that a clearance between the cylinder and the rotor is as small as possible. Therefore, in the Roots pump used in the anode gas pump 370, it is preferable that a specified value of a clearance C1 (FIG. 3) between the peripheral wall portion 742 of the cylinder 740 and a bud-shaped peripheral wall surface 762 of the rotor 760 is set to be more than 0 and 20 μm or less at, for example, normal temperature (typically, 25° C.). Likewise, it is preferable that specified values of a clearance C2 (FIG. 4) between the side wall portion 744 of the cylinder 740 and the first end surface 764 of the rotor 760 and a clearance C3 (FIG. 4) between the side wall portion 746 of the cylinder 740 and the second end surface 766 of the rotor 760 are also set to be more than 0 and 20 μm or less at, for example, normal temperature (typically, 25° C.).

During the operation of the fuel cell system, the temperature of the cylinder 740 of the anode gas pump 370 is dependent on a temperature of an environment in which the anode gas pump 370 is provided. In the embodiment, as described above, the temperature of the cylinder 740 is dependent on a temperature (environment temperature) in a front compartment of the vehicle. On the other hand, an initial temperature at the time of initiation of the operation of the rotor 760 can be considered to be the same as the temperature of the cylinder 740. On the other hand, regarding the temperature of the rotor 760 after the initiation of the operation, an inflow gas temperature of the anode gas pump 370 has no effect on the temperature of the cylinder 740 because it is lower than a temperature of the coolant flowing through the coolant exhaust pipe 420 and is typically 10° C. or lower. The temperature of the rotor 760 after the start changes from the initial temperature depending on the driving amount (the rotating speed or the gas flow rate) of the rotor 760, more specifically, a gas flow rate (gas inflow rate), a difference between an input side pressure and an output side pressure, and a temperature of inflow gas in the anode gas pump 370. Accordingly, as the gas flow rate increases according to the increase in the rotating speed of the rotor 760, a temperature difference between the temperature of the rotor 760 and the temperature of the cylinder 740 is more likely to increase. As described above, in a case where the temperature of the rotor 760 is higher than that of the cylinder 740, a difference in thermal expansion or shrinkage amount between the cylinder 740 and the rotor 760 becomes more significant, and the clearance between the rotor 760 and the cylinder 740 decreases. As this state progresses, malfunction of the rotation of the rotor 760 occurs due to an interference between the rotor 760 and the cylinder 740, and a locked state where the rotor 760 cannot rotate may occur in the end.

In the embodiment, as described below, the heating portion 500 is controlled to heat the cylinder 740 of the anode gas pump 370 such that the temperature of the cylinder 740 approaches the temperature of the rotor 760. As a result, the temperature difference between the rotor 760 and the cylinder 740 is reduced, and the rotor 760 and the cylinder 740 are controlled not to interfere with each other.

Figure 5:
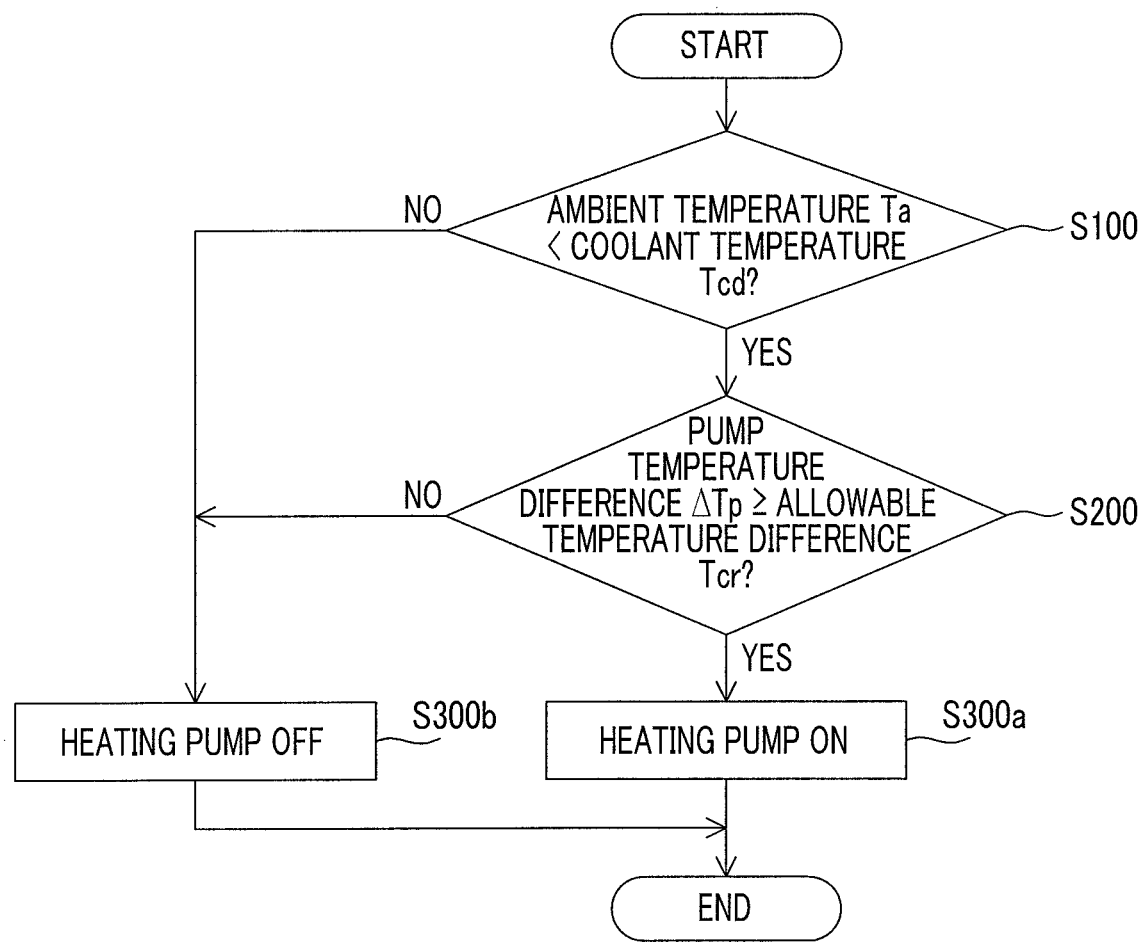
FIG. 5 is a flowchart showing a heating treatment that is performed by a controller controlling a heating portion.

FIG. 5 is a flowchart showing a heating treatment that is performed by the controller 600 controlling the heating portion 500. The heating treatment is repeatedly performed by the controller 600 from the time when the anode gas pump 370 starts to be driven (initiates) by initiating the fuel cell system 10 to the time when the driving of the anode gas pump 370 ends.

In step S100, the controller 600 determines whether or not a temperature (coolant temperature) Tcd of the coolant Lc (FIG. 1) of the coolant exhaust pipe 420 is higher than an ambient temperature Ta.

An environment temperature corresponding to the temperature (hereinafter, also simply referred to as "cylinder temperature") of the cylinder 740 of the anode gas pump 370 can be considered to be the same as the ambient temperature at the time of the initiation of the operation. At least in a case where the coolant temperature Tcd is lower than the ambient temperature Ta (cylinder temperature), even when the heating portion 500 is operated such that the coolant Lc as the heating medium Lh is circulated to the cylinder passage 750 of the anode gas pump 370, the cylinder 740 of the anode gas pump 370 cannot be heated. In a case where the coolant temperature Tcd is lower than the ambient temperature Ta (Step S100: NO), in Step S300b, the heating medium supply pump 550 of the heating portion 500 is not driven ("heating pump OFF"), and the cylinder 740 is not heated.

After the initiation of the operation of the fuel cell system 10, the coolant Lc heated by exhaust heat of the fuel cell 100 flows through the coolant exhaust pipe 420. The temperature of the coolant Lc is 40° C. to 70° C. and typically about 60° C. due to a relationship between an increase in the temperature of the coolant caused by the exhaust heat of the fuel cell 100 and the cooling performance of the radiator 430. Accordingly, the coolant temperature Tcd is typically higher than the ambient temperature Ta after the initiation of the operation. In a case where the coolant temperature Tcd is higher than the ambient temperature Ta (Step S100: YES), in step S200, the controller 600 determines whether or not a temperature difference (hereinafter, also simply referred to as "pump temperature difference") ΔTp between the rotor 760 and the cylinder 740 is likely to be higher than or equal to an allowable temperature difference Tcr. The determination (step S200) on whether or not the pump temperature difference ΔTp is likely to be higher than or equal to the allowable temperature difference Tcr performed as described below.

Figure 6:
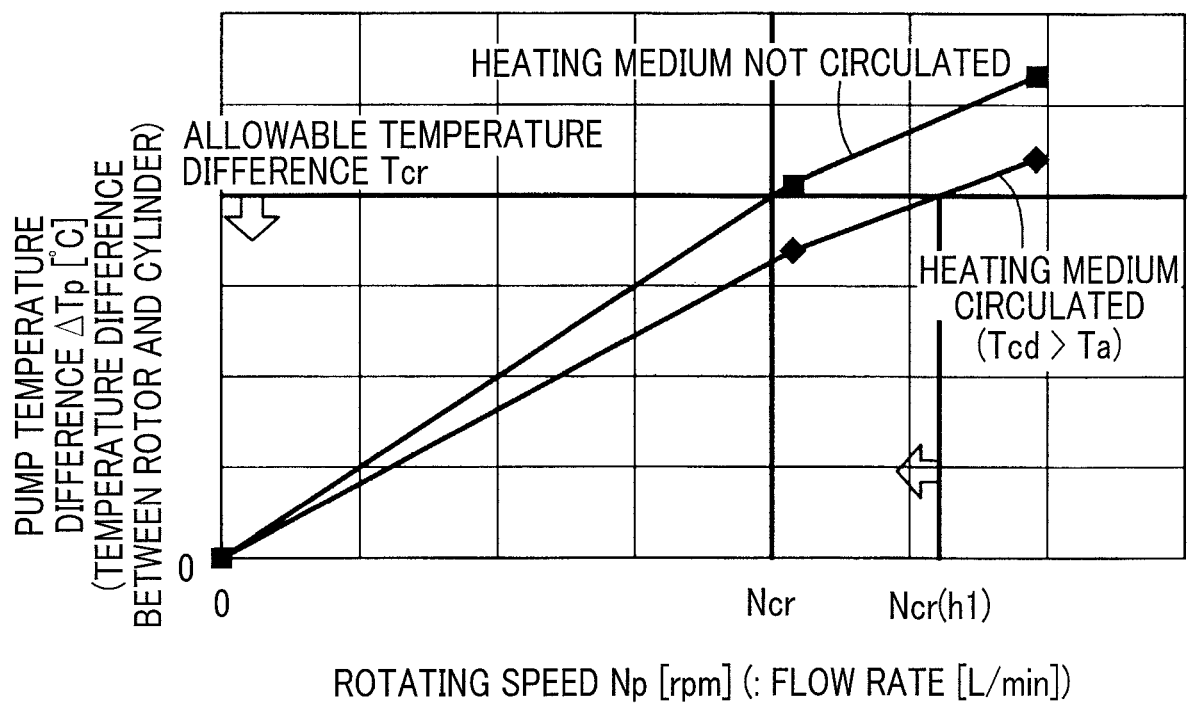
FIG. 6 is a graph showing an example of a relationship between a rotating speed of the rotor of the anode gas pump and a temperature difference Δ between the rotor and a cylinder.

FIG. 6 is a graph showing an example of a relationship between a rotating speed Np of the rotor 760 of the anode gas pump 370 and the temperature difference ΔTp between the rotor 760 and the cylinder 740. The horizontal axis represents the rotating speed Np [rpm] as the driving amount of the anode gas pump 370, and the rotating speed Np corresponds to the flow rate [L/min] of the anode gas. The vertical axis represents the temperature difference (pump temperature difference) ΔTp [° C.] between the rotor 760 and the cylinder 740. At the time of the initiation of the operation (initial operation), that is, when the rotating speed Np is 0 rpm, the temperatures (initial temperatures) of the rotor 760 and the cylinder 740 are the same as each other. The temperature (cylinder temperature) of the cylinder 740 is constant at the temperature (initial temperature) at the time of the initiation of the operation. In this case, the pump temperature difference ΔTp of the vertical axis can be considered to correspond to an increased temperature of the rotor 760 from the temperature of the rotor 760 equal to the temperature of the cylinder 740 at the time of the initiation of the operation. The pump temperature difference ΔTp at the rotating speed Np is an increased temperature of the rotor 760 when the temperature increase of the rotor 760 converges and becomes stable in a state the driving of the rotor 760 at the rotating speed Np starts to increase the temperature of the rotor 760 and is continued. The pump temperature difference ΔTp is an estimated value of the increased temperature at the set rotating speed Np.

As shown in FIG. 6, in a state where the cylinder 740 of the anode gas pump 370 is not heated by the heating portion 500 (state where the heating medium is not circulated), the temperature of the rotor 760 increases according to the increase in the rotating speed Np, and the pump temperature difference ΔTp increases according to the temperature increase of the rotor 760. The allowable temperature difference Tcr is a temperature difference that is allowable as the pump temperature difference ΔTp such that an interference between the rotor 760 and the cylinder 740 due to a difference in expansion or shrinkage amount generated by the temperature difference between the rotor 760 and the cylinder 740 does not occur.

The determination on whether or not the pump temperature difference ΔTp is higher than or equal to the allowable temperature difference Tcr can be performed as described below in "<Determination Method 1>". The determination may be performed as described below in "<Determination Method 2>".

Determination Method 1

In a state where the temperatures of the cylinder 740 and the rotor 760 at the time of the initiation of the operation are the same and the temperature of the cylinder 740 is constant, a relationship between the rotating speed Np of the anode gas pump 370 and the increased temperature of the rotor 760 is obtained in advance as the relationship (refer to FIG. 6) between the rotating speed Np and the pump temperature difference ΔTp. The rotating speed Np corresponding to the case where the pump temperature difference ΔTp is the allowable temperature difference Tcr is obtained as a rotating speed threshold Ncr based on the obtained relationship, and the rotating speed threshold Np is stored in a storage unit 602 of the controller 600. In Step S200 of FIG. 5, the controller 600 determines whether or not the pump temperature difference ΔTp is likely to be higher than or equal to the allowable temperature difference Tcr by determining whether or not the rotating speed Np of the rotor 760 is likely to be higher than or equal to the rotating speed threshold Ncr corresponding to the allowable temperature difference Tcr. In this case, the rotating speed Np of the rotor 760 can be considered as "driving state of the hydrogen circulation pump", and the rotating speed threshold Ncr can be considered as "standard driving state".

Determination Method 2

In a state where the temperatures of the cylinder 740 and the rotor 760 at the time of the initiation of the operation are the same and the temperature of the cylinder 740 is constant, a relationship between the rotating speed Np of the anode gas pump 370 and the increased temperature of the rotor 760 is obtained in advance as the relationship (refer to FIG. 6) between the rotating speed Np and the pump temperature difference ΔTp. This relationship is stored in the storage unit 602 of the controller 600. In Step S200 of FIG. 5, the pump temperature difference ΔTp corresponding to the rotating speed Np of the rotor 760 is obtained based on the obtained relationship between the rotating speed Np and the pump temperature difference ΔTp, and the controller 600 determines whether or not the pump temperature difference ΔTp is likely to be the allowable temperature difference Tcr. In this case, the pump temperature difference ΔTp can be considered as "driving state of the hydrogen circulation pump", and the allowable temperature difference Tcr can be considered as "standard driving state".

In the determination method 1, the controller 600 determines whether or not the rotating speed Np of the rotor 760 is higher than or equal to the rotating speed threshold Ncr. Therefore, as compared to the determination method 2, the controller 600 can simply determine whether or not the pump temperature difference ΔTp is likely to be higher than or equal to the allowable temperature difference Tcr.

In the determination method, in a state where the temperature of the cylinder 740 is constant at the initial temperature at the time of the initiation of the operation, the increased temperature of the rotor corresponding to the rotating speed Np of the rotor can be simply considered as the pump temperature difference ΔTp. The reason is as follows. The environment temperature of the front compartment on which the fuel cell system is mounted can be considered to be the same as the ambient temperature at the time of the initiation of the operation, and can be considered to be higher than the ambient temperature after the initiation of the operation. Therefore, assuming that the temperature of the cylinder 740 is constant at the temperature at the time of the initiation of the operation, it is considered that the temperature difference (pump temperature difference) between the rotor 760 and the cylinder 740 is the maximum value in terms of any driving amount of the rotor 760. The reason for this is as follows. By considering the increased temperature of the rotor 760 from the initiation of the operation of the anode gas pump 370, which is obtained according to the driving amount of the rotor 760, as the pump temperature difference, in a case where the pump temperature difference is higher than or equal to the predetermined allowable temperature difference under one most severe condition, the heating medium can be circulated to the cylinder passage 750 to heat the cylinder 740.

In Step S200 of FIG. 5, in a case where the pump temperature difference ΔTp is lower than the allowable temperature difference Tcr, in Step S300b, the heating medium supply pump 550 of the heating portion 500 is not driven ("heating pump OFF"), and the cylinder 740 of the anode gas pump 370 is not heated. On the other hand, in a case where the pump temperature difference ΔTp is higher than or equal to the allowable temperature difference Tcr, the pump temperature difference ΔTp is expected to be higher than or equal to the allowable temperature difference Tcr, in step S300a, the heating medium supply pump 550 of the heating portion 500 is driven ("heating pump ON"), and the cylinder 740 of the anode gas pump 370 is heated.

As shown in FIG. 6, in a state where the cylinder 740 of the anode gas pump 370 is heated by the heating portion 500 (state where the heating medium is circulated), the temperature of the cylinder 740 increases according to the temperature of the heating medium Lh. Therefore, in a state where the heating medium is circulated, as compared to a case where the heating medium is not circulated, the pump temperature difference ΔTp can be reduced, and the rotating speed Np at which the pump temperature difference ΔTp is higher than or equal to the allowable temperature difference Tcr can be increased to a value Ncr (h1) that is higher than the rotating speed threshold Ncr. As a result, in a case where the operation range of the anode gas pump 370 is set such that the rotating speed Np is 0 or higher and lower than Ncr (h1), the anode gas pump 370 can be operated such that an interference between the rotor 760 and the cylinder 740 caused by the pump temperature difference between the cylinder 740 and the rotor 760 in the anode gas pump 370 does not occur.

The value Ncr (h1) of the rotating speed Np corresponding to the allowable temperature difference Tcr in a state where the heating medium is circulated is dependent on the temperature of the heating medium Lh, that is, the coolant Lc. Therefore, it is preferable that the output (generated electric power) of the fuel cell system 10 is limited to limit the rotating speed Np until the temperature of the coolant Lc after the initiation of the operation increases to a temperature that is sufficiently high as the temperature of the heating medium Lh. As the temperature of the heating medium Lh increases and approaches the temperature of the rotor 760, the cylinder 740 can be heated such that the pump temperature difference ΔTp approaches 0. Therefore, the heating effect can be improved, and the effect of suppressing an interference between the cylinder 740 and the rotor 760 can be improved. In a case where the temperature of the heating medium Lh is higher than the temperature of the rotor 760, the ON/OFF of the heating medium supply pump 550 is intermittently controlled, and the heating of the cylinder 740 is intermittently controlled. As a result, the state where the pump temperature difference ΔTp is close to 0 can be maintained, and the effect of suppressing an interference between the cylinder 740 and the rotor 760 can also be improved.

The allowable temperature difference Tcr is determined based on a design pump temperature difference ΔTp (D) and a safety factor in which an interference between the rotor 760 and the cylinder 740 occurs due to a difference in expansion or shrinkage amount generated by the temperature difference between the rotor 760 and the cylinder 740. For example, in a case where the design pump temperature difference ΔTp (D) is 20° C. and the safety factor S is 2, the allowable temperature difference Tcr is set as Tcr=ΔTp (D)/S=10° C.

As described above, the rotating speed threshold Ncr used in the description for determining whether or not the pump temperature difference ΔTp is higher than or equal to the allowable temperature difference Tcr is obtained by dividing the design pump temperature difference ΔTp (D) by the safety factor S to obtain the allowable temperature difference Tcr and obtaining a value of the rotating speed Np corresponding to the obtained allowable temperature difference Tcr. However, the rotating speed threshold Ncr is not limited to this value. For example, a value of the rotating speed Np corresponding to the design pump temperature difference ΔTp (D), may be divided by the safety factor S to obtain the rotating speed threshold Ncr, and the pump temperature difference ΔTp corresponding to the obtained rotating speed threshold Ncr may be obtained as the allowable temperature difference Tcr.

The design pump temperature difference ΔTp (D) is a temperature that is set based on characteristics (in particular, linear expansion coefficient) of materials used for the rotor 760 and the cylinder 740 and the clearance therebetween. Typically, the design pump temperature difference ΔTp (D) is set to be preferably in a range of 10° C. to 30° C. The safety factor S is set to be preferably in a range of 1 to 2 and more preferably in a range of 1.5 to 2. The allowable temperature difference Tcr is also set to be preferably in a range of 10° C. to 30° C., and the rotating speed threshold Ncr is set to be preferably in a range of 2000 rpm to 5500 rpm (the gas flow rate is set to be preferably in range of 160 L/min to 450 L/min).

For the anode gas pump 370, various metal materials such as stainless steel or aluminum are used. The rotor 760 and the cylinder 740 may be made of the same metal material or different metal materials. However, the configuration in which the rotor 760 and the cylinder 740 are made of the same metal material is advantageous in that the linear expansion coefficients can be made to be the same, the thermal expansion or shrinkage amounts of the rotor 760 and the cylinder 740 can be made to be close to each other, and an interference between the rotor 760 and the cylinder 740 can be further suppressed. Many kinds of stainless steel have lower linear expansion coefficients than aluminum, but aluminum is preferable to stainless steel from the viewpoint of reducing the weight.

In either case, the relationship shown in FIG. 6 between the rotating speed Np of the anode gas pump 370 and the temperature difference $\Delta Tp$ between the rotor 760 and the cylinder 740 is obtained in advance, and the allowable temperature difference Tcr and the rotating speed threshold Ncr are obtained as described above. As a result, by performing heating treatment according to the flow shown in FIG. 5, an interference between the rotor 760 and the cylinder 740 can be suppressed.

As described above, according to the first embodiment, malfunction of the anode gas pump 370 occurring due to an interference between the cylinder 740 and the rotor 760 in the anode gas pump 370 can be suppressed.

B. Second Embodiment

Figure 7:
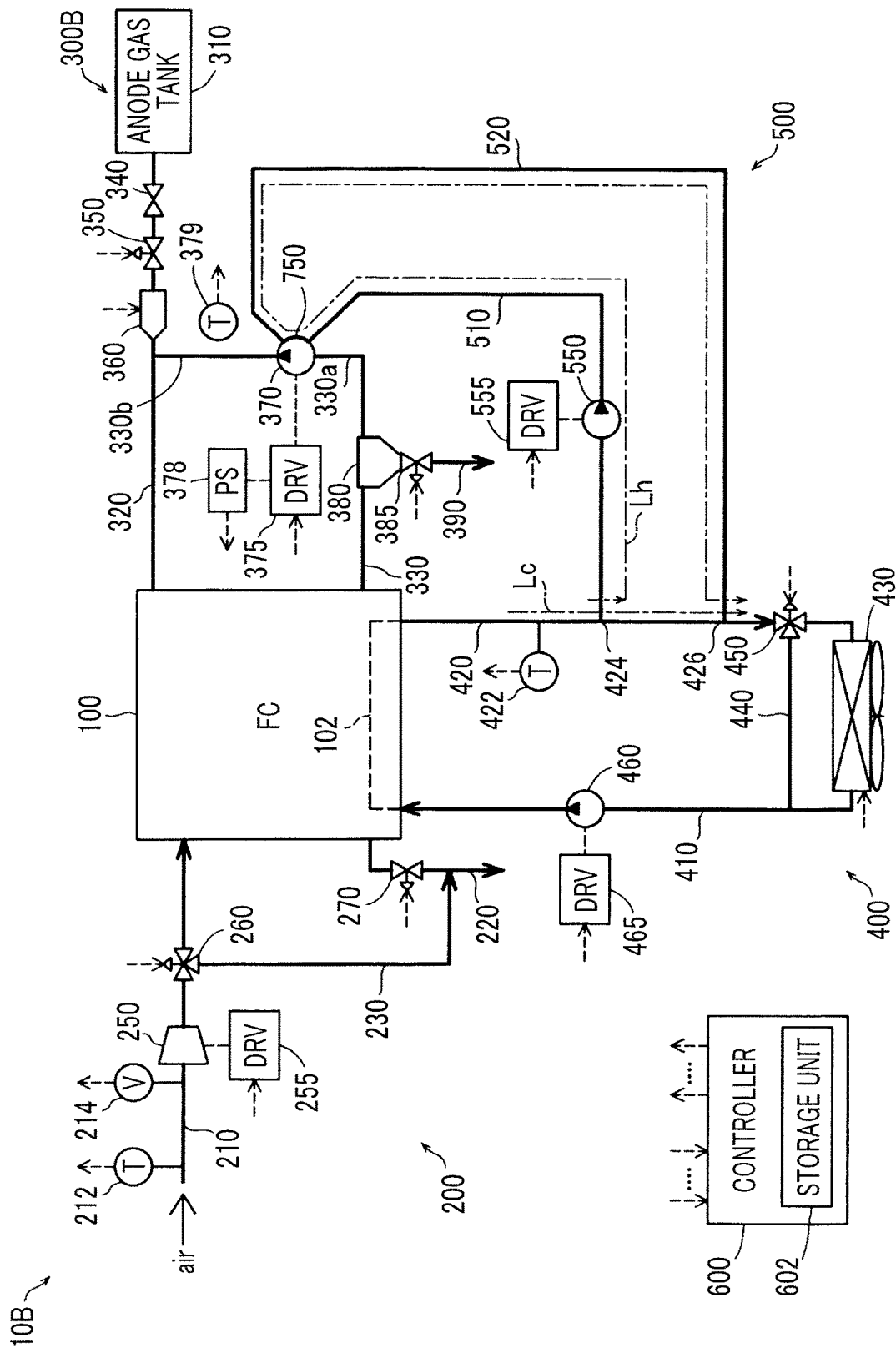
FIG. 7 is a diagram schematically showing a fuel cell system according to a second embodiment.

FIG. 7 is a diagram schematically showing a fuel cell system 10B according to a second embodiment. The fuel cell system 10B is different from the fuel cell system 10 according to the first embodiment in that: an environment temperature sensor 379 that detects an environment temperature of the anode gas pump 370 as the temperature corresponding to the temperature of the cylinder 740 of the anode gas pump 370 is provided; and a method of determining whether or not the pump temperature difference $\Delta Tp$ is likely to be higher than or equal to the allowable temperature difference Tcr in the heating treatment of the controller 600 is different as described below. Other configurations of the fuel cell system 10B are the same as those of the fuel cell system 10 (FIG. 1) according to the first embodiment.

In the second embodiment, unlike the first embodiment, instead of obtaining the increased temperature of the rotor 760 as the pump temperature difference $\Delta Tp$, the pump temperature difference $\Delta Tp$ is obtained based on the increased temperature of the rotor 760 and the temperature of the cylinder 740, and the controller 600 determines whether or not the obtained pump temperature difference $\Delta Tp$ is likely to be higher than or equal to the allowable temperature difference Tcr. In this case, the pump temperature difference $\Delta Tp$ can be considered as "driving state of the hydrogen circulation pump", and the allowable temperature difference Tcr can be considered as "standard driving state".

Figure 8:
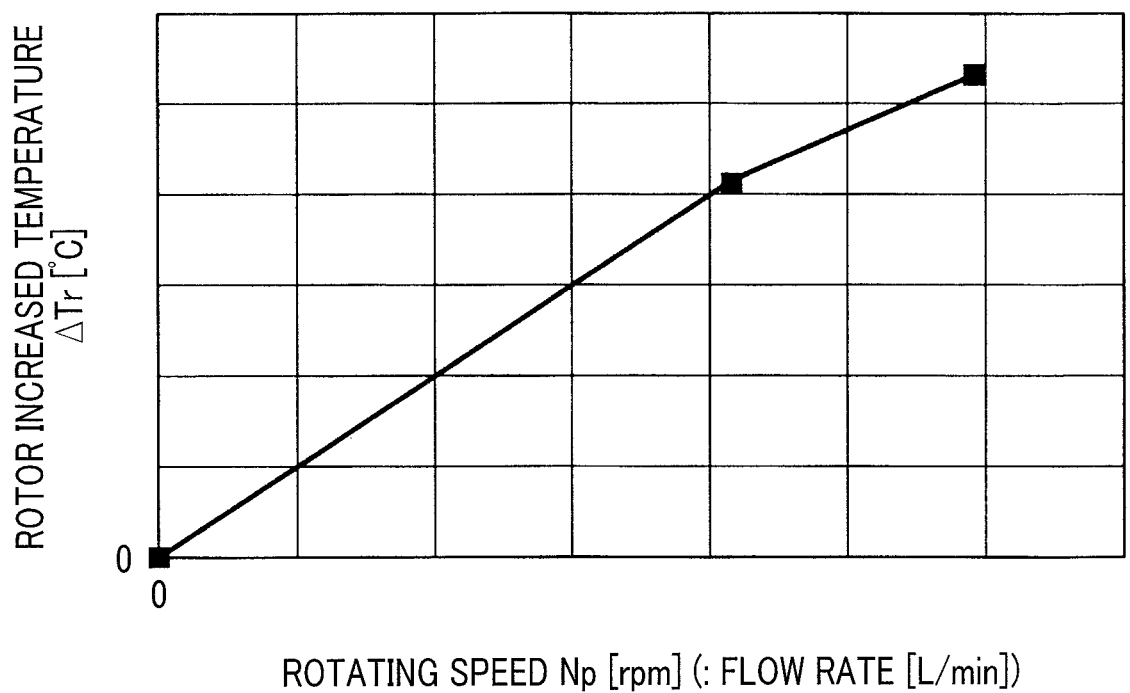
FIG. 8 is a graph showing an example of a relationship between the rotating speed of the rotor of the anode gas pump and an increased temperature of the rotor that is used for obtaining a pump temperature difference.

FIG. 8 is a graph showing an example of a relationship between the rotating speed Np of the rotor 760 of the anode gas pump 370 and an increased temperature $\Delta Tr$ of the rotor 760 that is used for obtaining the pump temperature difference $\Delta Tp$. As in the case of FIG. 6, the horizontal axis represents the rotating speed Np [rpm] of the rotor 760 as the driving amount of the anode gas pump 370, and the rotating speed Np corresponds to the flow rate [L/min] of the gas. The vertical axis represents the pump temperature difference $\Delta Tp$ shown in the vertical axis of FIG. 6 as the increased temperature $\Delta Tr$ from the temperature of the rotor 760 at the time of the initiation of the operation. The increased temperature $\Delta Tr$ at the rotating speed Np is an increased temperature of the rotor 760 when the temperature increase of the rotor 760 converges and becomes stable in a state the driving of the rotor 760 at the rotating speed Np starts to increase the temperature of the rotor 760 and is continued. The pump temperature difference $\Delta Tp$ is an estimated value of the increased temperature at the set rotating speed Np. FIG. 8 is equivalent to FIG. 6 showing the relationship between the rotating speed Np of the rotor 760 and the pump temperature difference $\Delta Tp$ in a state where the heating medium is not circulated. The relationship shown in FIG. 8 is measured in advance and is stored in the storage unit 602 of the controller 600.

The pump temperature difference $\Delta Tp$ (Np) at the rotating speed Np of the rotor 760 is obtained as follows based on the relationship shown in FIG. 8. First, based on the relationship shown in FIG. 8, the rotor increased temperature $\Delta Tr$ (Np) at the rotating speed Np is obtained, and the temperature (cylinder temperature) Ts (Np) of the cylinder 740 is obtained. The cylinder temperature is a temperature corresponding to a temperature of an environment in which the anode gas pump 370 is provided. Simply, the environment temperature of the anode gas pump 370 detected by the environment temperature sensor 379 may be used instead as it is. In the embodiment, the environment temperature of the anode gas pump 370 detected by the environment temperature sensor 379 is used as the cylinder temperature Ts (Np) at the rotating speed Np. Likewise, as an initial temperature (hereinafter, also simply referred to as "cylinder initial temperature") Ts0 of the cylinder 740 at the time of the initiation of the operation, the environment temperature of the anode gas pump 370 detected by the environment temperature sensor 379 is used at the time of initiation of the operation (Np=0) At the time of the initiation of the operation, the temperature detected by the environment temperature sensor 379 and the temperature detected by the ambient temperature sensor 212 are the same. Therefore, the ambient temperature detected by the ambient temperature sensor 212 may be used as the cylinder initial temperature Ts0.

A rotor temperature Tr (Np)(=Ts0+$\Delta Tr$(Np)) is obtained based on the rotor increased temperature $\Delta Tr$(Np) obtained as described above and the cylinder initial temperature Ts0 as the rotor initial temperature. The pump temperature difference $\Delta Tp$ (Np)(=Tr(Np)−Ts(Np)) is obtained based on the obtained rotor temperature Tr(Np) and the cylinder temperature Ts(Np). In step S200 (FIG. 5), the controller 600 determines whether or not the pump temperature difference $\Delta Tp$ (Np) obtained as described above is likely to be higher than or equal to the allowable temperature difference Tcr.

In the second embodiment, as in the case of the first embodiment, malfunction of the anode gas pump 370 occurring due to an interference between the cylinder 740 and the rotor 760 can be suppressed. In the first embodiment, in a state where the temperature of the cylinder 740 is constant, the rotor increased temperature from the initiation of the operation is obtained as the pump temperature difference. On the other hand, in the second embodiment, the pump temperature difference is obtained in consideration of a change of the cylinder temperature during the operation at the rotating speed Np from the initiation of the operation. Therefore, the determination on whether or not the pump temperature difference is likely to be higher than or equal to the predetermined allowable temperature difference can be performed with higher accuracy, an interference between the rotor and the cylinder can be further suppressed, and malfunction can be further suppressed.

C. Third Embodiment

Figure 9:
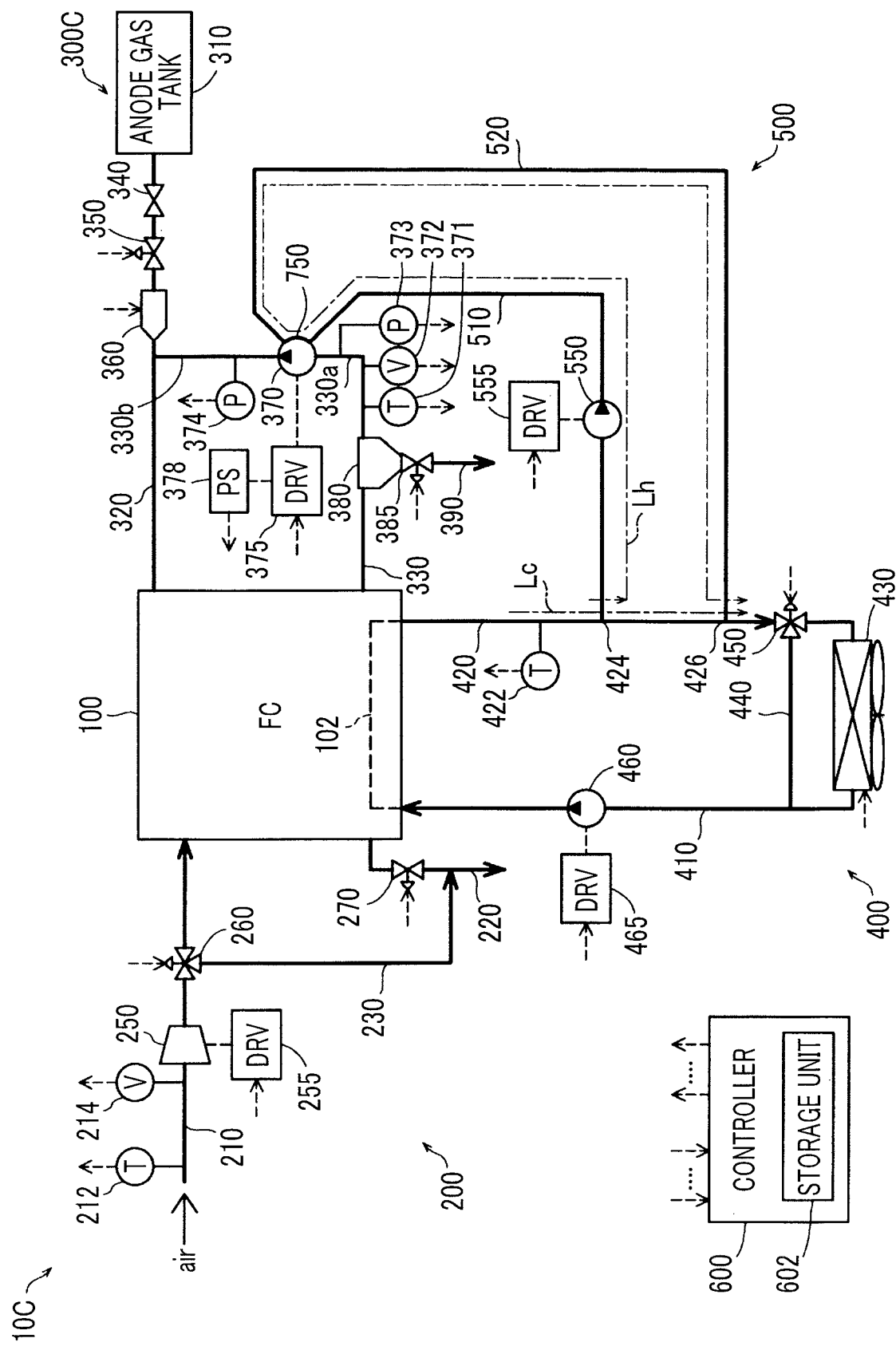
FIG. 9 is a diagram schematically showing a fuel cell system according to a third embodiment.

FIG. 9 is a diagram schematically showing a fuel cell system 10C according to a third embodiment. The fuel cell system 10C is different from the fuel cell system 10 according to the first embodiment in that: an anode gas supply portion 300C is provided instead of the anode gas supply portion 300 of the fuel cell system 10 (FIG. 1) according to the first embodiment; and a method of determining whether or not the pump temperature difference ΔTp is higher than or equal to the allowable temperature difference Tcr in the heating treatment of the controller 600 is different as described below. Other configurations of the fuel cell system 10C are the same as those of the fuel cell system 10.

In the anode gas supply portion 300C, a gas temperature sensor 371 that detects a temperature of anode gas flowing into the anode gas pump 370, a flow rate sensor 372 that detects an inflow rate of the anode gas, and an inflow gas pressure sensor 373 that detects a pressure of the anode gas are provided in the portion 330a of the anode gas circulation pipe 330 between the gas-liquid separator 380 and the anode gas pump 370. An outflow gas pressure sensor 374 that detects a pressure of the anode gas flowing out from the anode gas pump 370 is provided in the portion 330a of the anode gas circulation pipe 330 through which the anode gas pump 370 and the anode gas supply pipe 320 are connected to each other. The inflow gas pressure sensor 373 can be considered as "input side pressure sensor", and the outflow gas pressure sensor 374 can be considered as "output side pressure sensor".

An estimated value (hereinafter, also simply referred to as "rotor temperature Tr") of the rotor temperature Tr of the rotor 760 of the anode gas pump 370 and an estimated value (hereinafter, also simply referred to as "cylinder temperature Ts") of the cylinder temperature Ts of the cylinder 740 can be obtained from calculation described below.

In a case where an amount of heat Q [J/sec] is applied to an object having a heat capacity C [J/K] for a time Δt [sec], an increased temperature ΔT [K] is expressed by the following Expression (1) according to the law of the conservation of energy.

$$\Delta T = Q \times \Delta t / C \quad (1)$$

In a case where Expression (1) is applied to the rotor 760 and the cylinder 740, the rotor temperature Tr of the rotor 760 and the cylinder temperature Ts of the cylinder 740 are expressed by the following Expression (2) and the following Expression (3), and the pump temperature difference ΔTp is expressed by the following Expression (4).

$$Tr = Tr0 + \{[\alpha r \times (Tg - Tr0) \times Ar] \times \Delta t / Cr\} \quad (2)$$

$$Ts = Ts0 + \{[\alpha s \times (Tg - Ts0) \times As] \times \Delta t / Cs\} - \{[\alpha a \times (Tg - Ts0) \times As] \times \Delta t / Cs\} \quad (3)$$

$$\Delta Tp = Tr - T0 \quad (4)$$

Tr0 represents an initial temperature [K] of the rotor, αr represents a heat transfer coefficient [W/(m²·K)] of the rotor, Tg represents a gas temperature [K] in the cylinder, Ar represents a surface area [m²] of the rotor, and Cr represents a heat capacity [J/K] of the rotor. Ts0 represents an initial temperature [K] of the cylinder, as represents a heat transfer coefficient [W/(m²·K)] in the cylinder, As represents an inner surface area [m²] of the cylinder, Cs represents a heat capacity [J/K] of the cylinder, and aa represents a heat transfer coefficient [W/(m²·K)] relating to heat radiation of the cylinder, and Ta represents an environment temperature [K].

The second term of Expression (2) represents an increased temperature component corresponding to a work amount of the rotor 760. In Expression (3), the second term of represents an increased temperature component of the cylinder 740 corresponding to a work amount of the rotor 760, and the third term represents a heat radiation temperature component from the outer surface of the cylinder 740.

As the initial temperature Tr0 of the rotor and the initial temperature Ts0 of the cylinder, for example, the temperature detected by the ambient temperature sensor 212 at the time of the initiation of the operation can be used. The surface area Ar of the rotor, the inner surface area As of the cylinder, the heat capacity Cr of the rotor, and the heat capacity Cs of the cylinder are known constants. The gas temperature Tg in the cylinder, the heat transfer coefficient αr of the rotor, the heat transfer coefficient as of the cylinder, and the heat transfer coefficient αa relating to heat radiation of the cylinder are obtained as follows.

The gas temperature Tg in the cylinder can be obtained according to the following Expression (5) based on an input side pressure Pi detected by the gas temperature sensor 371, an output side pressure Po detected by the outflow gas pressure sensor 374, and an inflow gas temperature Ti detected by the gas temperature sensor 371.

$$Tg = Ti \times (Po/Pi)^{(\gamma-1)/\gamma} \quad (5)$$

γ represents a ratio of specific heat, and γ=7/5 is satisfied because a target gas is a diatomic molecule.

The heat transfer coefficients αr and as are proportional to a gas inflow rate Vi and can be obtained according to the following Expressions (6) and (7).

$$\alpha r = kr \times Vi \quad (6)$$

$$\alpha s = ks \times Vi \quad (7)$$

kr and ks are constants determined according to materials to be used, and are the same in a case where the rotor 760 and the cylinder 740 are made of the same metal material.

The heat transfer coefficient as can be obtained according to the following Expression (8).

$$\alpha a = 0.037 \times (\lambda/L) \times Re^{4/3} \times Pr^{1/3} \quad (8)$$

λ represents a thermal conductivity [W/m·K] of fluid in the vicinity of the cylinder, L represents a representative length (m) of the cylinder, Re represents a Reynold's number, and Pr represents a Prandtl number.

The Reynold's number can be obtained according to the following Expression (9), and the Prandtl number can be obtained according to the following Expression (10).

$$Re = (\rho \times v \times L)/\mu \quad (9)$$

$$Pr = (\mu \times cp)/\lambda \quad (10)$$

ρ represents a density [Kg/m³] of fluid in the vicinity of the cylinder, μ represents a viscosity coefficient [Pa·s] of the fluid, v represents a velocity [m/s] of the fluid, and cp represents a specific heat [J/(kg·K)] of the fluid.

The density ρ, the viscosity coefficient μ, the velocity v, the specific heat cp, the representative length L, the thermal conductivity λ can be predetermined. Therefore, the heat transfer coefficient αr can be obtained in advance using Expressions (8), (9), and (10).

Accordingly, estimated values of the rotor temperature Tr and the cylinder temperature Ts after the elapse of a predetermined time Te can be obtained by using the time Δt of Expression (2) and Expression (3) as the predetermined time Te. An estimated value of the pump temperature difference $\Delta$Tp after the elapse of the predetermined time Te can be obtained according to Expression (4).

As described above, the gas temperature Tg in the cylinder is obtained according to Expression (5) based on the input side pressure Pi, the output side pressure Po, and the inflow gas temperature Ti, and the heat transfer coefficient $\alpha$r of the rotor and the heat transfer coefficient $\alpha$s of the cylinder are obtained according to Expressions (6) and (7) based on the gas inflow rate Vi. Estimated values of the rotor temperature Tr and the estimated cylinder temperature Ts in $\Delta$T=te are obtained according to Expression (2) and Expression (3). Therefore, an estimated value of the pump temperature difference $\Delta$Tp can be obtained according to Expression (4). In step S200 (FIG. 5), the controller 600 determines whether or not the pump temperature difference $\Delta$Tp obtained as described above is likely to be higher than or equal to the allowable temperature difference Tcr. In this case, the pump temperature difference $\Delta$Tp can be considered as "driving state of the hydrogen circulation pump", and the allowable temperature difference Tcr can be considered as "standard driving state".

In the third embodiment, as in the case of the first embodiment, malfunction of the anode gas pump 370 occurring due to an interference between the cylinder 740 and the rotor 760 can be suppressed. In the third embodiment, estimated values of the rotor temperature Tr and the cylinder temperature Ts are obtained based on a gas temperature of anode gas actually flowing into the anode gas pump 370, a gas inflow rate of the anode gas, and an input side pressure and an output side pressure of the anode gas pump 370, and then an estimated value of the pump temperature difference $\Delta$Tp is obtained. As a result, the controller 600 can determine whether or not the obtained pump temperature difference $\Delta$Tp is likely to be higher than or equal to the allowable temperature difference Tcr.

In the above description, as the initial temperature Tr0 of the rotor and the initial temperature Ts0 of the cylinder, the temperature detected by the ambient temperature sensor 212 at the time of the initiation of the operation is used. In a case where the environment temperature sensor 379 is provided as in the case of the second embodiment, the temperature detected by the environment temperature sensor 379 at the time of the initiation of the operation may be used as the initial temperature Tr0 of the rotor and the initial temperature Ts0 of the cylinder.

In the cylinder temperature Ts expressed by Expression (3), the increased temperature shown in the second term is typically canceled by the heat radiation temperature of the third term. Therefore, instead of obtaining the cylinder temperature Ts according to Expression (3), the temperature at the time of the initiation of the operation detected by the ambient temperature sensor 212 may be used as the initial temperature of the cylinder temperature. In a case where the environment temperature sensor 379 is provided as in the case of the second embodiment, the temperature at the time of the initiation of the operation detected by the environment temperature sensor 379 may be used as the initial temperature of the cylinder temperature.

D. Fourth Embodiment

Figure 10:
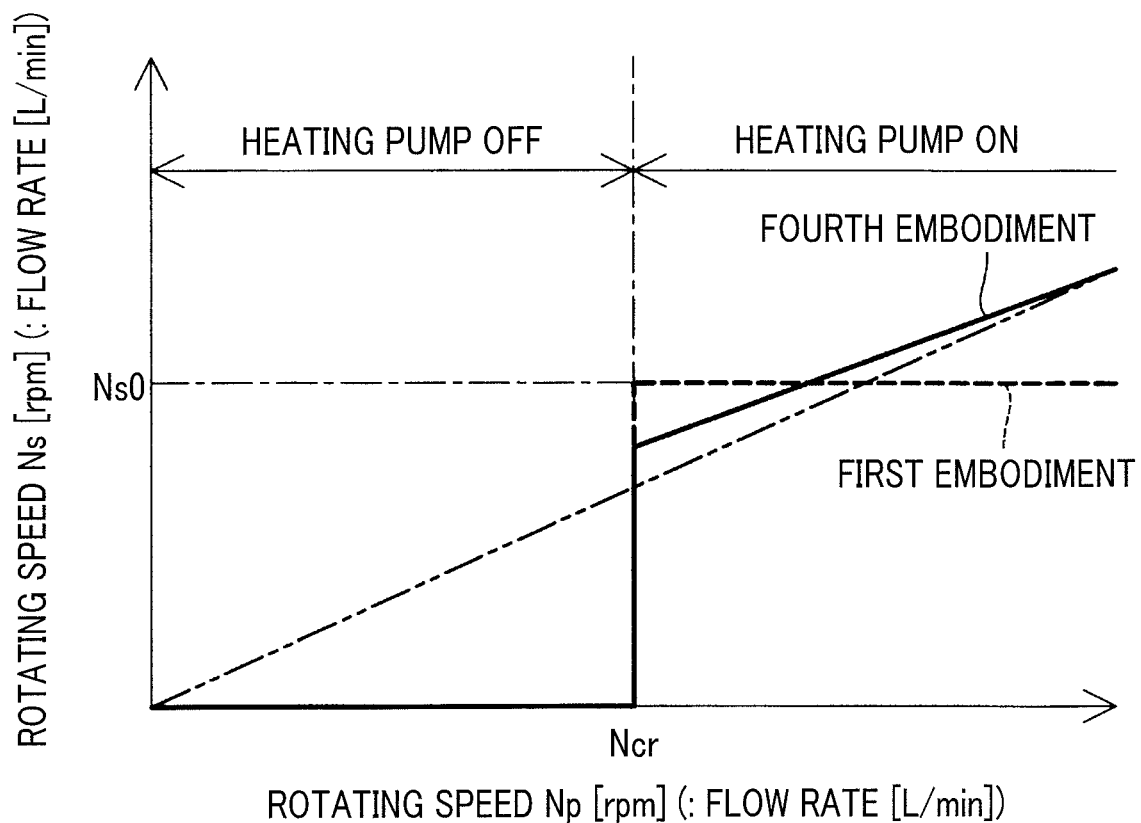
FIG. 10 is a graph showing a relationship between a driving amount of a heating medium supply pump and a driving amount of the anode gas pump in a fourth embodiment.

FIG. 10 is a graph showing a relationship between a driving amount of the heating medium supply pump 550 and a driving amount of the anode gas pump 370 in a fourth embodiment. The horizontal axis represents the rotating speed Np of the rotor 760 as the driving amount of the anode gas pump 370, and the vertical axis represents a rotating speed Ns of the rotor as a driving amount of the heating medium supply pump 550. Configurations of a fuel cell system according to the fourth embodiment are the same as those of the fuel cell system 10 according to the first embodiment.

As indicated by a broken line, in the first embodiment, in a case where the heating medium supply pump 550 is driven ("heating pump ON"), the rotating speed Ns as the driving amount of the heating medium supply pump 550 is set as a constant rotating speed (Ns=Ns0). On the other hand, in the fourth embodiment, as indicated by a solid line, by increasing the rotating speed Ns of the heating medium supply pump 550 according to the increase of the rotating speed Np of the anode gas pump 370, the flow rate of the heating medium that is circulated to the cylinder passage 750 (refer to FIGS. 1 and 2) of the anode gas pump 370 is increased. As a result, regarding the temperature of the rotor 760 that increases according to the increase of the rotating speed of the anode gas pump 370, by effectively supplying the heating medium, the rotor 760 can be effectively heated, and the occurrence of malfunction due to an interference between the rotor and the cylinder can be further suppressed effectively.

In the above description, in a case where the rotating speed Np of the anode gas pump 370 is lower than the rotating speed threshold Ncr, that is, in a case where the pump temperature difference $\Delta$Tp is lower than the allowable temperature difference Tcr, the heating medium supply pump 550 is not driven (heating pump OFF). However, the embodiment is not limited to this configuration. Even in a case where the rotating speed Np of the anode gas pump 370 is lower than the rotating speed threshold Ncr, by increasing the rotating speed Ns of the heating medium supply pump 550 according to the increase of the rotating speed Np (refer to a two-dot chain line of FIG. 11), the flow rate of the heating medium that is circulated to the cylinder passage 750 (refer to FIGS. 1 and 2) of the anode gas pump 370 may be increased.

E. Fifth Embodiment

Figure 11:
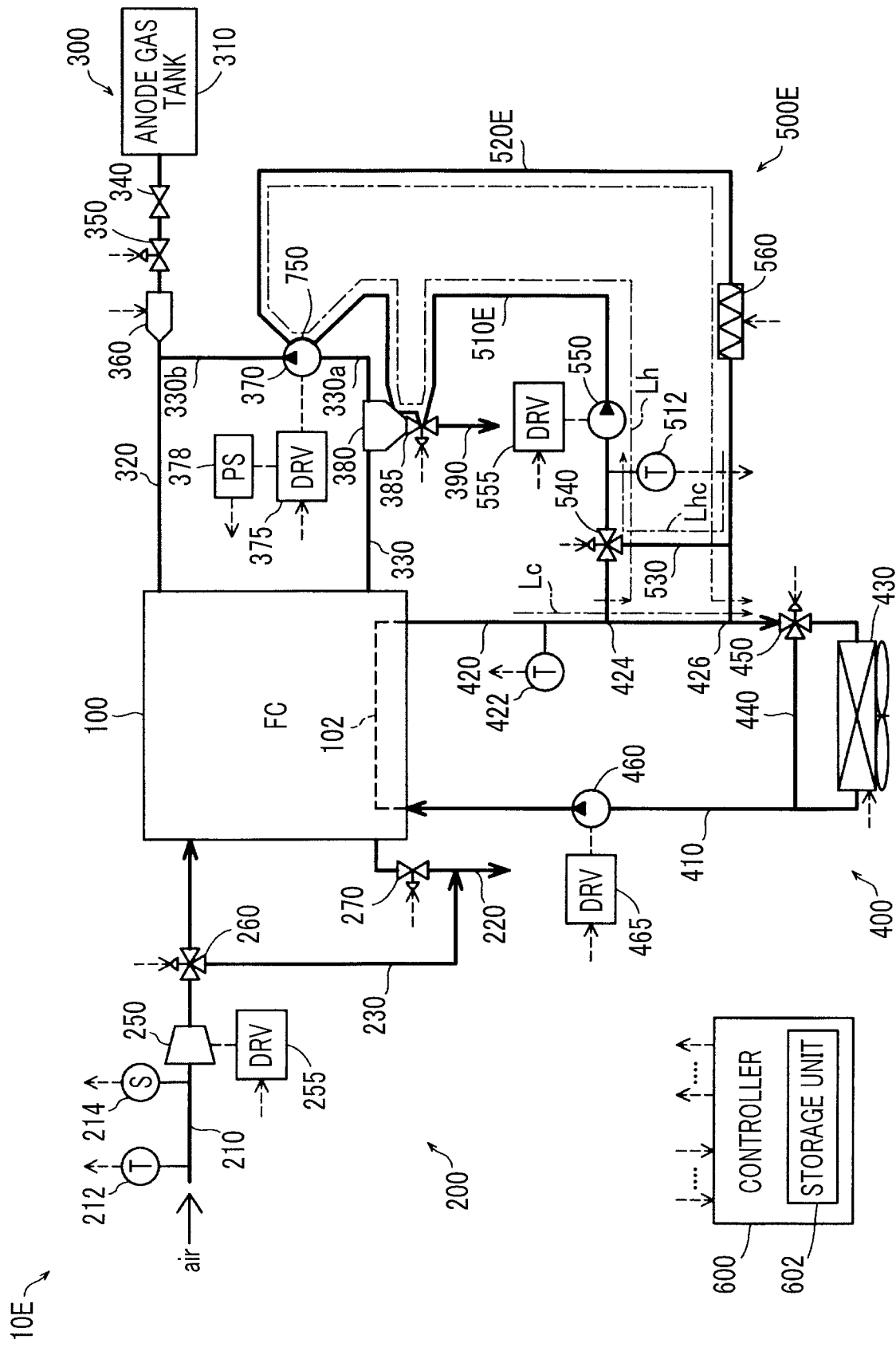
FIG. 11 is a diagram schematically showing a fuel cell system according to a fifth embodiment.

FIG. 11 is a diagram schematically showing a fuel cell system 10E according to a fifth embodiment. The fuel cell system 10E is different from the fuel cell system 10 in that: a heating portion 500E is provided instead of the heating portion 500 of the fuel cell system 10 (FIG. 1) according to the first embodiment; and a heating treatment of the cylinder 740 using the controller 600 is different as described below. Other configurations of the fuel cell system 10E are the same as those of the fuel cell system 10.

The heating portion 500E includes a heating medium supply pipe 510E, a heating medium circulation pipe 520E, a bypass pipe 530, a three-way valve 540, and the heating medium supply pump 550. As in the case of the heating medium supply pipe 510 (FIG. 1), the heating medium supply pipe 510E is connected to the branch position 424 of the coolant exhaust pipe 420 and to the inlet of the cylinder passage 750 of the anode gas pump 370. The heating medium supply pipe 510E is connected to a portion (not shown) of the heating medium passage that is positioned between the heating medium supply pump 550 and the cylinder passage 750 and where the exhaust-drain valve 385 and the gas-liquid separator 380 (hereinafter, also simply referred to as "the exhaust-drain valve 385 and the like") are provided.

As in the case of the heating medium circulation pipe 520 (FIG. 1), the heating medium circulation pipe 520E is connected to the outlet of the cylinder passage 750 in the anode gas pump 370 and to the joint position 426 of the coolant exhaust pipe 420. In the heating medium circulation pipe 520E, unlike the heating medium circulation pipe 520, a heating unit 560 that heats the heating medium circulating in the heating medium circulation pipe 520E is provided. The heating unit 560 is typically used for air conditioning of the vehicle. As described below, the heating unit 560 can also be used for heating the exhaust-drain valve 385 and the like and the cylinder 740 of the anode gas pump 370.

In the heating medium supply pipe 510E, the three-way valve 540 and the heating medium supply pump 550 are provided in this order in an end portion on the branch position 424 side. A heating medium temperature sensor 512 for detecting a temperature of the heating medium is provided between the three-way valve 540 and the heating medium supply pump 550 of the heating medium supply pipe 510E. The temperature of the heating medium detected by the heating medium temperature sensor 512 is input to the controller 600 and is used for controlling the temperature of the heating medium using the heating unit 560.

The three-way valve 540 is connected to the bypass pipe 530 branched from the heating medium circulation pipe 520E on the downstream side of the heating unit 560. The three-way valve 540 drives the heating medium supply pump 550 to adjust the flow rate of the coolant as the heating medium flowing in from the branch position 424 and the flow rate of the heating medium flowing in and circulating from the heating medium circulation pipe 520 through the bypass pipe 530. By blocking the inflow from the branch position 424, the three-way valve 540 can circulate and supply a heating medium Lhc circulating to the bypass pipe 530 to the exhaust-drain valve 385 and the like and the anode gas pump 370. In this case, by heating the heating medium using the heating unit 560, the heating medium heated by the heating unit 560 can be circulated and supplied to the exhaust-drain valve 385 and the like and the anode gas pump 370. In this case, the exhaust-drain valve 385 and the like and the cylinder 740 of the anode gas pump 370 can be heated within a short period of time.

On the other hand, by blocking the inflow from the bypass pipe 530, the three-way valve 540 can circulate and supply the coolant Lc as the heating medium Lh flowing in from the coolant exhaust pipe 420 to the exhaust-drain valve 385 and the like and the anode gas pump 370. In this case, by using the coolant Lc heated by exhaust heat of the fuel cell 100 as the heating medium Lh, the exhaust-drain valve 385 and the like and the cylinder 740 of the anode gas pump 370 can be heated. For example, the temperature of the coolant Lc can be increased using heat using that is generated from the fuel cell 100 by generating power from the fuel cell 100 with low efficiency.

Figure 12:
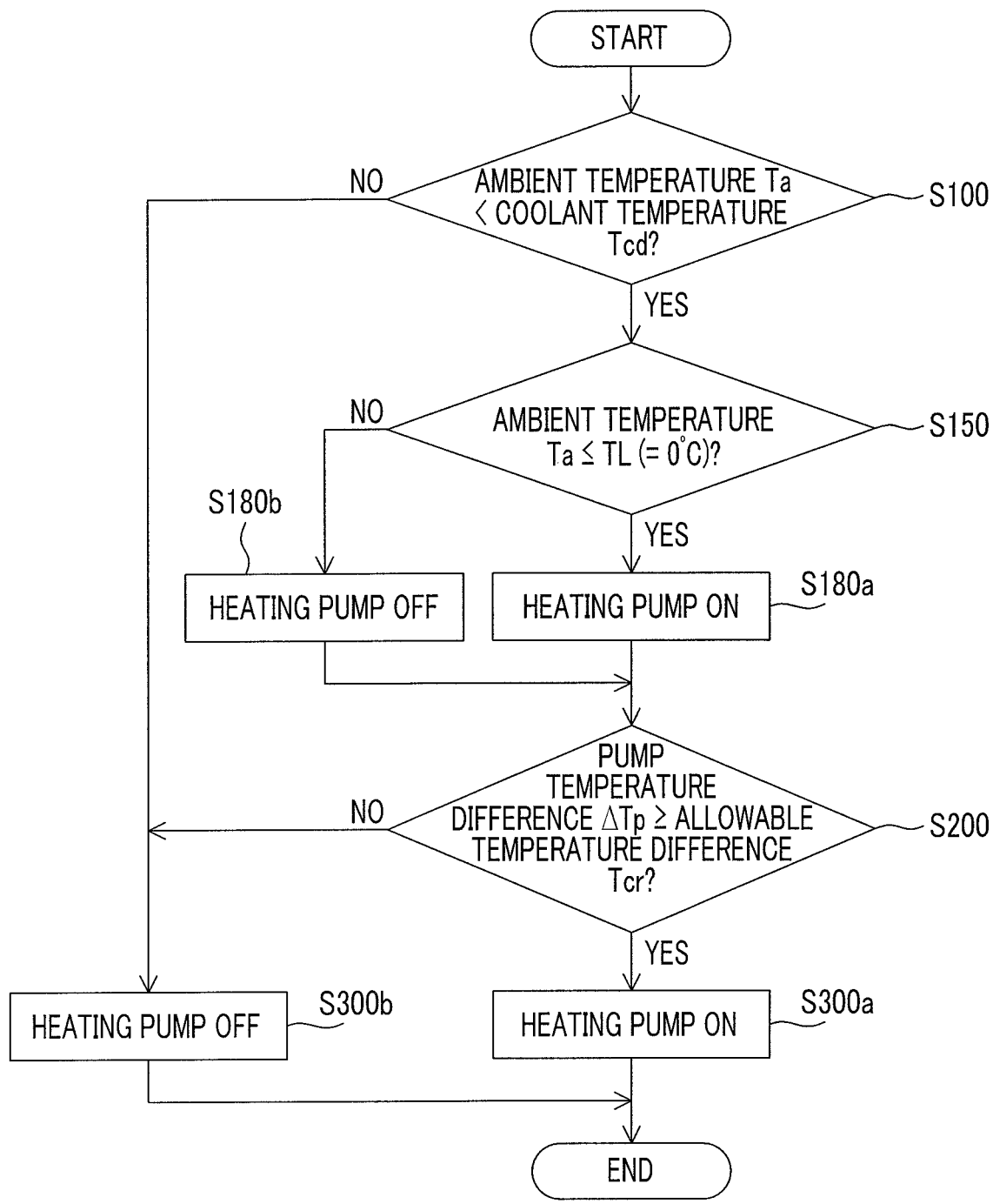
FIG. 12 is a flowchart showing a heating treatment that is performed by the controller controlling the heating portion.

FIG. 12 is a flowchart showing a heating treatment that is performed by the controller 600 controlling the heating portion 500E. In the heating treatment, a portion of a heating treatment described below is added between step S100 and step S200 of the heating treatment (FIG. 5) of the first embodiment. The portion of the heating treatment including step S200 and steps S300a and S300b is the same as that of the first embodiment, and in a case where the pump temperature difference ΔTp is higher than or equal to the allowable temperature difference Tcr (step S200: YES), the heating medium supply pump 550 is driven ("heating pump ON"), and the cylinder 740 of the anode gas pump 370 is heated (step S300a). In a case where the pump temperature difference ΔTp is lower than the allowable temperature difference Tcr (step S200: NO), the heating medium supply pump 550 is not driven ("heating pump OFF"), and the cylinder 740 of the anode gas pump 370 is not heated (step S300b). As a result, as described in the first embodiment, malfunction of the anode gas pump 370 occurring due to an interference between the cylinder 740 and the rotor 760 in the anode gas pump 370 caused by a temperature difference (pump temperature difference) between the rotor 760 and the cylinder 740 in the anode gas pump 370 can be suppressed.

In the heating treatment of the fifth embodiment, not only the portion of the heating treatment including step S200 and steps S300a and S300b that is the same as that in the first embodiment but also a portion of the heating treatment including step S150 to step S180a or step S180b are performed.

In step S150, the controller 600 determines whether or not the ambient temperature Ta is lower than or equal to a low temperature determination temperature TL (for example, 0° C.). In a case where the ambient temperature Ta is lower than or equal to the low temperature determination temperature TL, the environment temperature of the anode gas pump 370 is also low according to the ambient temperature Ta. At the time of the initiation of the operation, the environment temperature of the anode gas pump 370 can be considered to be the same as the ambient temperature Ta. After the initiation of the operation, the ambient temperature of the anode gas pump 370 changes depending on the ambient temperature Ta, and is higher than the ambient temperature Ta. Therefore, assuming that the ambient temperature Ta is considered as a temperature corresponding to the temperature of the cylinder 740 of the anode gas pump 370, the ambient temperature Ta can be considered as the cylinder temperature under the most strict condition. In step S150, the ambient temperature Ta can be considered as the temperature corresponding to the cylinder temperature.

As the ambient temperature Ta as the temperature corresponding to the temperature (cylinder temperature) of the cylinder 740 of the anode gas pump 370 becomes lower, the temperature of the cylinder 740 decreases with respect to the temperature of the rotor 760, and the temperature difference (pump temperature difference) between the rotor 760 and the cylinder 740 is more likely to increase. Therefore, malfunction caused by an interference between the rotor 760 and the cylinder 740 is more likely to occur. In a case where the ambient temperature Ta is below freezing (lower than or equal to 0° C.), water remaining in the anode gas circulation pipe 330, the anode gas pump 370, the gas-liquid separator 380, or the exhaust-drain valve 385 freezes, and thus the exhaust-drain valve 385 or the anode gas pump 370 may also malfunction due to freezing or the like of the exhaust-drain valve 385 or the rotor 760.

In a case where the ambient temperature Ta is lower than or equal to the low temperature determination temperature TL (step S150: YES), in step S180a, the heating medium supply pump 550 is driven ("heating pump ON"), and the exhaust-drain valve 385 and the like and the cylinder 740 of the anode gas pump 370 are heated. A period of time in which the heating medium supply pump 550 is driven in step S180a may be set to be longer than or equal to a period of time that is obtained in advance based on at least an amount of heat needed for increasing the temperature of the cylinder 740 as the temperature equal to the ambient temperature Ta at the time of the initiation of the operation to be the low temperature determination temperature TL (0° C.), a temperature of the heating medium, and a heat capacity of the cylinder 740.

On the other hand, in a case where the ambient temperature Ta is higher than the low temperature determination temperature TL (step S150: NO), in step S180b, the heating medium supply pump 550 is not driven ("heating pump OFF"), and a treatment after step S200 is the same as that of the first embodiment.

In a case where the ambient temperature Ta is lower than or equal to the low temperature determination temperature TL (0° C.) due to the treatment of step S150 to step S180a or step S180b, the heating medium supply pump 550 is driven ("heating pump ON"), and the exhaust-drain valve 385 and the like and the cylinder 740 of the anode gas pump 370 can be heated by the heating medium. As a result, for example, in a case where the ambient temperature Ta at the time of the initiation of the operation is below freezing (lower than or equal to 0° C.), the exhaust-drain valve 385 and the like and the cylinder 740 of the anode gas pump 370 can be recovered from the frozen state. In a case where the ambient temperature Ta is lower than or equal to the low temperature determination temperature TL (0° C.), the cylinder 740 of the anode gas pump 370 is heated, and thus malfunction of the anode gas pump 370 occurring due to an interference between the cylinder 740 and the rotor 760 caused by a temperature difference (pump temperature difference) between the rotor 760 and the cylinder 740 can be suppressed.

For example, in a case where the ambient temperature Ta at the time of the initiation of the operation is below freezing (lower than or equal to 0° C.), in the heating portion 500E, the three-way valve 540 blocks the coolant from the FC cooling portion 400 and circulates only the heating medium through the bypass pipe 530, and the heating unit 560 heats the heating medium. As a result, the exhaust-drain valve 385 and the like can also be heated, and the cylinder 740 of the anode gas pump 370 can also be rapidly heated.

F. Sixth Embodiment

Figure 13:
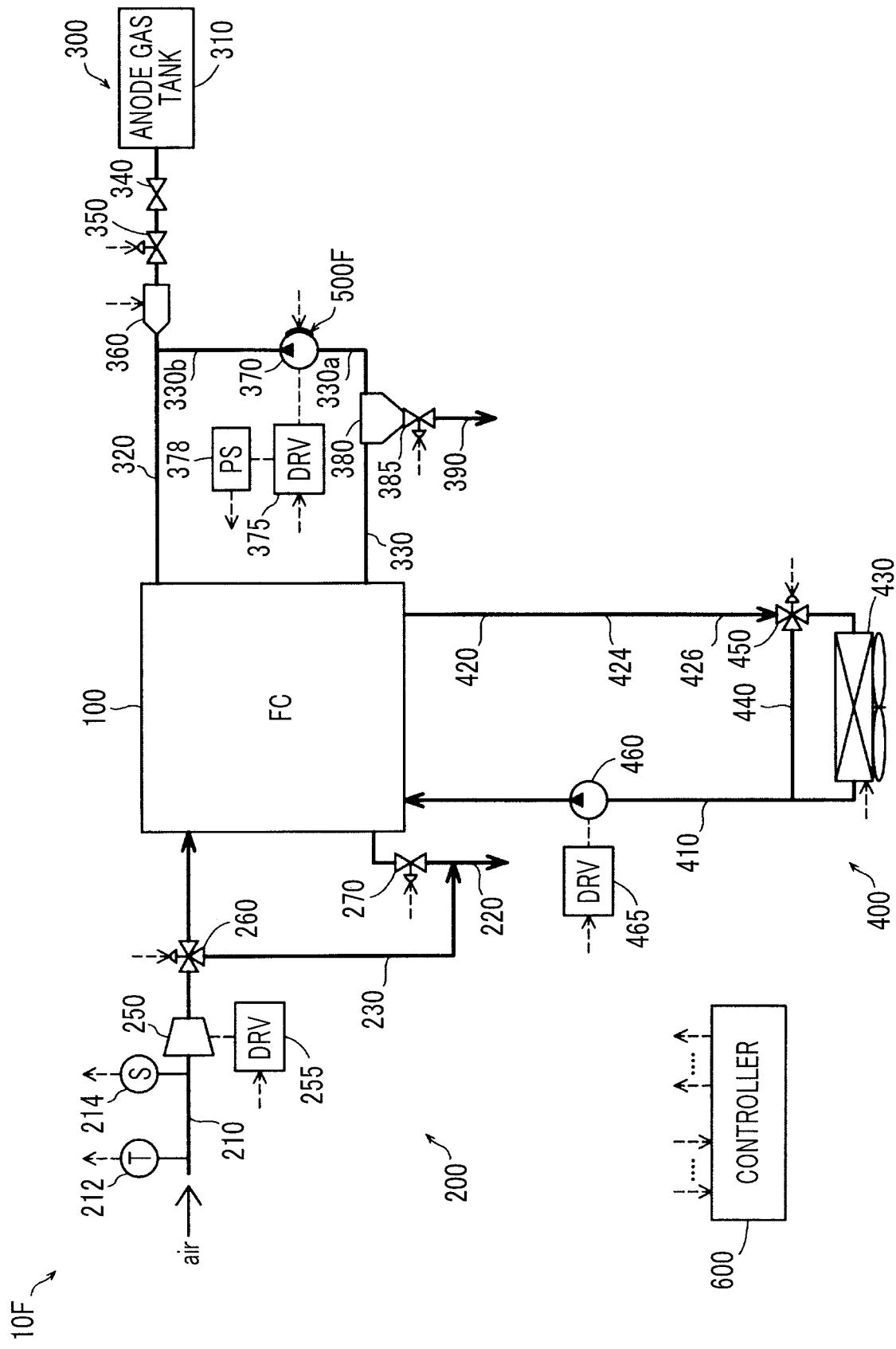
FIG. 13 is a diagram schematically showing a fuel cell system according to a sixth embodiment.

FIG. 13 is a diagram schematically showing a fuel cell system 10F according to a sixth embodiment. The fuel cell system 10F is different from the fuel cell system 10 in that a heating portion 500F is provided instead of the heating portion 500 of the fuel cell system 10 (FIG. 1) according to the first embodiment. Other configurations of the fuel cell system 10F are the same as those of the fuel cell system 10.

The heating portion 500F is a heating device attached to the cylinder 740, and is controlled by the controller 600. As the heating device, various general devices such as a heater are applicable.

In the configuration of the heating portion 500 according to the first embodiment, in a case where the temperature difference (pump temperature difference) ΔTp between the rotor 760 and the cylinder 740 in the anode gas pump 370 is likely to be higher than or equal to the allowable temperature difference Tcr, the cylinder 740 is heated by circulating the heating medium in the cylinder passage 750 of the cylinder 740 using the heating medium supply pump 550. On the other hand, in the sixth embodiment, in a case where the pump temperature difference ΔTp is likely to be higher than or equal to the allowable temperature difference Tcr, the cylinder 740 is heated using the heating device (heater) as the heating portion 500F attached to the cylinder 740.

In the sixth embodiment, as in the case of the first embodiment, malfunction of the anode gas pump 370 occurring due to an interference between the cylinder 740 and the rotor 760 in the anode gas pump 370 can be suppressed.

In the above description, the example in which the heating portion 500F is used instead of the heating portion 500 according to the first embodiment has been described, and this example is applicable to the second and third embodiments. The example is also applicable to the fourth embodiment. In a case where the heating portion 500F is applied to the fourth embodiment, the heating of the cylinder 740 using the heating device (heater) as the heating portion 500F attached to the cylinder 740 can be performed by increasing the amount of heating using the heating device according to the increase of the rotating speed Np of the anode gas pump 370.

G. Other Embodiments

The disclosure is not limited to the above-described embodiments, and various embodiments can be adopted within a range not departing from the scope of the disclosure. For example, the disclosure can also be implemented in the following embodiments.

(1) In the description of the first and second embodiments, the rotating speed of the rotor 760 of the anode gas pump 370 as the hydrogen circulation pump is used as the driving amount. However, by using the gas flow rate detected by the flow rate sensor as the driving amount and determining whether or not the gas flow rate is higher than or equal to a flow rate threshold corresponding to the allowable temperature difference, whether or not the temperature difference between the rotor and the cylinder is higher than or equal to the predetermined allowable temperature difference may be determined.

(2) In the first embodiment, instead of the ambient temperature Ta detected by the ambient temperature sensor 212, the environment temperature of the anode gas pump 370 detected by the environment temperature sensor may be used as the temperature corresponding to the cylinder temperature. The cylinder temperature detected by the temperature sensor attached to the cylinder 740 of the anode gas pump 370 may also be used. The same shall be applied to the other embodiments.

(3) In the description of the second embodiment, in a case where the environment temperature sensor 379 is provided, the environment temperature detected by the environment temperature sensor 379 is used as the cylinder temperature. However, the disclosure is not limited to this configuration. For example, by obtaining a correlation between the environment temperature and the cylinder temperature in advance, the cylinder temperature may be obtained based on the environment temperature of the anode gas pump 370 detected by the environment temperature sensor 379.

The cylinder temperature may be directly detected by a temperature sensor directly attached to the cylinder 740.

The cylinder temperature may be obtained without using the temperature sensor. As described above in the first embodiment, the radiator 430 is disposed in the front end of the front compartment of the vehicle, and cools the coolant heated by the exhaust heat of the fuel cell 100 using cooled air taken from the front side. Therefore, the air flowing to the inside of the front compartment is air heated for cooling the coolant. The internal temperature of the front compartment is dependent on the temperature of the air flowing to the inside of the front compartment. The temperature of the air flowing to the inside of the front compartment through the radiator 430 is a temperature increased from the ambient temperature due to exhaust heat generated when the radiator 430 cools the coolant. Therefore, the temperature of the air flowing to the inside of the front compartment through the radiator 430 can be estimated based on a speed of the vehicle, an ambient temperature, and temperatures of the coolant before and after the cooling by the radiator. By obtaining the internal temperature of the front compartment as the environment temperature of the anode gas pump 370 based on the vehicle speed detected by a speed sensor, the ambient temperature detected by the ambient temperature sensor, and the temperatures of the coolant before and after the cooling by the radiator detected by the coolant temperature sensor, the cylinder temperature may be obtained.

(4) As described above in the fourth embodiment, the control of increasing the rotating speed as the driving amount of the heating medium supply pump 550 according to the increase of the rotating speed as the driving amount of the anode gas pump 370 in the fuel cell system 10 according to the first embodiment is applicable to fuel cell systems according to the other embodiments.

(5) As described above in the fifth embodiment, the treatment of driving ("heating pump ON") the heating medium supply pump 550 by using the heating portion 500E instead of the heating portion 500 according to the first embodiment in a case where the ambient temperature Ta is lower than or equal to the low temperature determination temperature TL is applicable to the fuel cell systems according to the second to fifth embodiments.

(6) In the heating portion 500 according to the first to fifth embodiments, the three-way valve 540, the bypass pipe 530, and the heating unit 560 included in the heating portion 500E according to the sixth embodiment are not provided. However, the three-way valve 540, the bypass pipe 530, and the heating unit 560 may also be provided in the heating portion 500. The treatment that can be performed in the sixth embodiment, for example, the treatment of driving ("heating pump ON") the heating medium supply pump 550 in a case where the ambient temperature Ta is lower than or equal to the low temperature determination temperature TL or the treatment of circulating and supplying the heating medium to the cylinder passage 750 of the anode gas pump 370 through the bypass pipe 530 may be applied to the fuel cell systems according to the first to fifth embodiments.

(7) In the third embodiment, the example in which the increased temperature of the rotor 760 and the increased temperature of the cylinder corresponding to the work amount of the rotor 760 are obtained by calculation based on the gas inflow rate Vi to the anode gas pump 370, the input side pressure Pi, the output side pressure Po, and the inflow gas temperature Ti has been described. However, the disclosure is not limited to this configuration, the increased temperature of the rotor 760 and the increased temperature of the cylinder corresponding to the work amount of the rotor may be obtained using a calculation expression in which various parameters corresponding to the driving amount of the rotor are used. As long as the increased temperature of the rotor 760 and the increased temperature of the cylinder corresponding to the work amount of the rotor can be obtained, any calculation expression in which parameters corresponding to the work amount of the rotor are used may be used to obtain the increased temperatures.

(8) In the above-described embodiments, the heating portion 500 or 500E drives the heating medium supply pump 550 to circulate the heating medium to the cylinder passage 750 and to heat the cylinder 740. On the other hand, a valve of switching the flow of the medium of the three-way valve and the like to the branch position 424 of the coolant exhaust pipe 420 may be provided without providing the heating medium supply pump 550. In this case, the valve may be set such that, in a case where the heating medium is not circulated to the cylinder passage 750, all the coolant exhausted from the fuel cell 100 flows to the joint position 426, and the valve may be set such that, in a case where the heating medium is circulated to the cylinder passage 750, all the coolant exhausted from the fuel cell 100 flows to the heating medium supply pipe 510 as the heating medium.

(9) In the description of the above-described embodiments, in a case where the rotating speed Np of the anode gas pump 370 is lower than the rotating speed threshold Ncr, that is, in a case where the pump temperature difference ΔTp is lower than the allowable temperature difference Tcr, the heating medium supply pump 550 is not driven (heating pump OFF). The state where the heating medium supply pump 550 is not driven may be a state where, although the heating medium supply pump 550 is driven (heating pump ON), the rotating speed Ns of the heating medium supply pump 550 is zero or is set such that the flow rate of the heating medium is extremely small or substantially zero.

(10) In the above-described embodiments, the example in which the fuel cell system is mounted on the vehicle has been described. However, the disclosure is not limited to this example. The disclosure is applicable to fuel cell systems mounted on various moving objects such as a ship or an airplane in which electric power is used as a driving source of a power generating device (drive motor). The disclosure is also applicable not only to a fuel cell system mounted on a moving object but also to a stationary fuel cell system.

The disclosure is not limited to the above-described embodiments or the modification examples, and various configurations can be realized within a scope not departing from the scope of the disclosure. For example, in order to solve some or all of the above-described problems, or to achieve some or all of the above-described effects, the technical features in the embodiments, Examples, and Modification Example corresponding to the technical features in the respective aspects described in "SUMMARY" can be appropriately replaced or combined with each other. Unless specified as indispensable features in this specification, the technical features can be appropriately removed.

What is claimed is:

1. A fuel cell system comprising:
   a fuel cell;
   a hydrogen circulation pump configured to circulate hydrogen to the fuel cell, the hydrogen circulation pump including a cylinder and a rotor accommodated in the cylinder;
   a heating portion configured to heat the cylinder; and
   a controller configured to control an operation of the heating portion,
   wherein the controller is configured to cause the heating portion to heat the cylinder in a case where a temperature difference between the rotor and the cylinder is higher than or equal to an allowable temperature difference.

2. The fuel cell system according to claim 1, wherein in the hydrogen circulation pump, a clearance between the rotor and the cylinder is 20 μm or less.

3. The fuel cell system according to claim 1, wherein the heating portion includes
   a heating medium passage including a first passage and a second passage, the first passage being provided in the fuel cell, and the second passage being provided in the cylinder of the hydrogen circulation pump, and
   a heating medium supply pump configured to circulate a heating medium to the heating medium passage.

4. The fuel cell system according to claim 1, further comprising:
a driving amount sensor configured to detect a rotating speed of the rotor,
wherein the controller is configured to cause the heating portion to heat the cylinder in a case where the rotating speed of the rotor detected by the driving amount sensor is higher than or equal to a threshold rotating speed that is predetermined.

5. The fuel cell system according to claim 1, further comprising:
a driving amount sensor configured to detect a rotating speed of the rotor; and
a temperature sensor configured to detect a temperature corresponding to a temperature of the cylinder,
wherein the controller is configured to obtain the temperature difference between the rotor and the cylinder based on a temperature of the rotor and the temperature of the cylinder, the temperature of the rotor being determined based on an initial temperature of the cylinder and an increased temperature of the rotor, the initial temperature of the cylinder being obtained based on the temperature detected by the temperature sensor at a time of initiation of an operation of the hydrogen circulation pump, the increased temperature of the rotor being a temperature increased from the initiation of the operation of the hydrogen circulation pump that is obtained according to the rotating speed of the rotor detected by the driving amount sensor, and the temperature of the cylinder being obtained from the temperature detected by the temperature sensor in a state where the hydrogen circulation pump operates at the rotating speed of the rotor.

6. The fuel cell system according to claim 1, further comprising:
a temperature sensor configured to detect a temperature corresponding to a temperature of the cylinder;
a flow rate sensor configured to detect a gas inflow rate to the hydrogen circulation pump;
an input side pressure sensor configured to detect an input side pressure of the hydrogen circulation pump;
an output side pressure sensor configured to detect an output side pressure of the hydrogen circulation pump; and
a gas temperature sensor configured to detect a temperature of gas flowing to the hydrogen circulation pump,
wherein the controller is configured to obtain the temperature difference between the rotor and the cylinder based on an initial temperature of the rotor, an initial temperature of the cylinder, the gas inflow rate, the input side pressure, the output side pressure, and the temperature of the gas, the initial temperature of the rotor and the initial temperature of the cylinder being obtained based on the temperature detected by the temperature sensor at a time of initiation of an operation of the hydrogen circulation pump.

7. The fuel cell system according to claim 1, wherein the rotor and the cylinder are made of the same metal material.

8. The fuel cell system according to claim 3, further comprising:
a driving amount sensor configured to detect a rotating speed of the rotor,
wherein the controller is configured to cause the heating portion to heat the cylinder in a case where the rotating speed of the rotor detected by the driving amount sensor is higher than or equal to a threshold rotating speed that is predetermined.

9. The fuel cell system according to claim 3, further comprising:
a driving amount sensor configured to detect a rotating speed of the rotor; and
a temperature sensor configured to detect a temperature corresponding to a temperature of the cylinder,
wherein the controller is configured to obtain the temperature difference between the rotor and the cylinder based on a temperature of the rotor and the temperature of the cylinder, the temperature of the rotor being determined based on an initial temperature of the cylinder and an increased temperature of the rotor, the initial temperature of the cylinder being obtained based on the temperature detected by the temperature sensor at a time of initiation of an operation of the hydrogen circulation pump, the increased temperature of the rotor being a temperature increased from the initiation of the operation of the hydrogen circulation pump that is obtained according to the rotating speed of the rotor detected by the driving amount sensor, and the temperature of the cylinder being obtained from the temperature detected by the temperature sensor in a state where the hydrogen circulation pump operates at the rotating speed of the rotor.

10. The fuel cell system according to claim 3, further comprising:
a temperature sensor configured to detect a temperature corresponding to a temperature of the cylinder;
a flow rate sensor configured to detect a gas inflow rate to the hydrogen circulation pump;
an input side pressure sensor configured to detect an input side pressure of the hydrogen circulation pump;
an output side pressure sensor configured to detect an output side pressure of the hydrogen circulation pump; and
a gas temperature sensor configured to detect a temperature of gas flowing to the hydrogen circulation pump,
wherein the controller is configured to obtain the temperature difference between the rotor and the cylinder based on an initial temperature of the rotor, an initial temperature of the cylinder, the gas inflow rate, the input side pressure, the output side pressure, and the temperature of the gas, the initial temperature of the rotor and the initial temperature of the cylinder being obtained based on the temperature detected by the temperature sensor at a time of initiation of an operation of the hydrogen circulation pump.

11. The fuel cell system according to claim 3, wherein the rotor and the cylinder are made of the same metal material.

12. The fuel cell system according to claim 8, wherein the controller is configured to increase a flow rate of the heating medium by increasing the driving amount of the heating medium supply pump according to an increase in the rotating speed of the rotor in a case where the heating medium supplied by the heating medium supply pump is circulated to the cylinder.

* * * * *